(12) United States Patent
Joo

(10) Patent No.: US 9,625,784 B2
(45) Date of Patent: Apr. 18, 2017

(54) METHOD FOR TUNING COLOR OF A DISPLAY REGION AND APPARATUS THEREOF

(75) Inventor: Jae Hyun Joo, Hwaseong-si (KR)

(73) Assignee: NANOBRICK CO., LTD. (KR)

( * ) Notice: Subject to any disclaimer, the term of this patent is extended or adjusted under 35 U.S.C. 154(b) by 0 days.

(21) Appl. No.: 13/388,983

(22) PCT Filed: Jun. 28, 2011

(86) PCT No.: PCT/KR2011/004708
§ 371 (c)(1),
(2), (4) Date: Feb. 3, 2012

(87) PCT Pub. No.: WO2012/002701
PCT Pub. Date: Jan. 5, 2012

(65) Prior Publication Data
US 2012/0133672 A1 May 31, 2012

(30) Foreign Application Priority Data

Jun. 29, 2010 (KR) .................. 10-2010-0062044
Jul. 19, 2010 (KR) .................. 10-2010-0069530
(Continued)

(51) Int. Cl.
G09G 3/34 (2006.01)
G02F 1/167 (2006.01)
(Continued)

(52) U.S. Cl.
CPC ............ *G02F 1/167* (2013.01); *G02B 1/005* (2013.01); *G02B 26/007* (2013.01); *G02B 26/02* (2013.01);
(Continued)

(58) Field of Classification Search
CPC .................. G09G 2310/062; G02F 1/167
(Continued)

(56) References Cited

U.S. PATENT DOCUMENTS 6,639,578 B1 10/2003 Comiskey et al.
8,227,825 B2 * 7/2012 Diana ................ B82Y 20/00
257/98
(Continued)

FOREIGN PATENT DOCUMENTS

JP 2000298465 A 10/2000
JP 2004062052 A 2/2004
(Continued)

OTHER PUBLICATIONS

International Search Report for PCT Application PCT/KR2011/004708, Korean Intellectual Property Office, Jan. 12, 2012.
(Continued)

*Primary Examiner* — Temesghen Ghebretinsae
*Assistant Examiner* — Lisa Landis
(74) *Attorney, Agent, or Firm* — Fitch Even Tabin & Flannrey LLP

(57) ABSTRACT

The present invention provides a method of changing color or transmittance of light on a surface part of an object. The surface part of the object includes a solvent and a plurality of particles dispersed in the solvent. When electric field is applied to the solvent and the plurality of particles, the transmittance of color or light on the surface part of the object is changed due to the change of the inter-particle distances or the positions of the particles, according to the magnitude, direction, application time or application frequency of electric field, wherein the magnitude, direction, application time or application frequency of electric field are changed by associating the input signal by the user of the object or the signal acquired by the object or the signal acquired by the sensing unit provided to the object.

27 Claims, 40 Drawing Sheets

(30) Foreign Application Priority Data

| | | |
|---|---|---|
| Jul. 19, 2010 | (KR) | 10-2010-0069531 |
| Jul. 26, 2010 | (KR) | 10-2010-0072061 |
| Aug. 16, 2010 | (KR) | 10-2010-0078968 |
| Aug. 27, 2010 | (KR) | 10-2010-0083545 |
| Aug. 31, 2010 | (KR) | 10-2010-0084951 |
| Apr. 8, 2011 | (KR) | 10-2011-0032798 |
| Jun. 27, 2011 | (KR) | 10-2011-0062195 |
| Jun. 27, 2011 | (KR) | 10-2011-0062211 |
| Jun. 27, 2011 | (KR) | 10-2011-0062289 |
| Jun. 27, 2011 | (KR) | 10-2011-0062308 |

(51) Int. Cl.
 *G02F 1/17* (2006.01)
 *G09G 3/20* (2006.01)
 *G02F 1/23* (2006.01)
 *G02B 1/00* (2006.01)
 *G02B 26/02* (2006.01)
 *G02B 26/00* (2006.01)
 *B82Y 20/00* (2011.01)
 *G02F 1/21* (2006.01)

(52) U.S. Cl.
 CPC ............... *G02F 1/17* (2013.01); *G02F 1/23* (2013.01); *G09G 3/2003* (2013.01); *G09G 3/3446* (2013.01); *B82Y 20/00* (2013.01); *G02F 1/21* (2013.01); *G02F 2001/1678* (2013.01); *G02F 2201/44* (2013.01); *G02F 2201/58* (2013.01); *G02F 2202/32* (2013.01); *G02F 2203/055* (2013.01); *G02F 2203/34* (2013.01); *G09G 2310/062* (2013.01)

(58) Field of Classification Search
 USPC .................................................. 345/105–107
 See application file for complete search history.

(56) References Cited

U.S. PATENT DOCUMENTS

| | | | |
|---|---|---|---|
| 2003/0034950 A1* | 2/2003 | Liang et al. ................ | 345/107 |
| 2006/0077171 A1* | 4/2006 | May ....................... | G09G 3/344 345/107 |
| 2006/0250349 A1* | 11/2006 | Kim ....................... | G09G 3/344 345/107 |
| 2007/0070282 A1* | 3/2007 | Shibahara .......... | G02F 1/134363 349/141 |
| 2007/0268566 A1* | 11/2007 | Yang ....................... | G02F 1/167 359/296 |
| 2008/0018589 A1* | 1/2008 | Shih ....................... | G09G 3/344 345/107 |
| 2008/0230752 A1* | 9/2008 | Bower ................... | B82Y 20/00 252/584 |
| 2008/0316578 A1 | 12/2008 | Karasawa et al. | |
| 2009/0034055 A1* | 2/2009 | Gibson ............. | G02F 1/133516 359/296 |
| 2010/0079424 A1 | 4/2010 | Fan et al. | |
| 2010/0218140 A1* | 8/2010 | Feke .................... | A61B 5/0059 715/810 |
| 2011/0096088 A1* | 4/2011 | Lee ......................... | G09G 3/344 345/596 |
| 2012/0038972 A1* | 2/2012 | Gibson ................... | G02F 1/167 359/296 |
| 2012/0044128 A1 | 2/2012 | Joo et al. | |

FOREIGN PATENT DOCUMENTS

| | | |
|---|---|---|
| JP | 2006-047614 A | 2/2006 |
| JP | 2006293002 A | 10/2006 |
| JP | 2008129179 A | 6/2008 |
| JP | 2008-525836 A | 7/2008 |
| JP | 2010-113010 A | 5/2010 |
| KR | 10-2009-0006453 A | 1/2009 |
| KR | 10-2009-0086192 A | 8/2009 |
| WO | 2006067482 A2 | 6/2006 |

OTHER PUBLICATIONS

Stuart Cherry, "Smart Skins", Password, Nov. 2009, pp. 23-25.
Japan Patent Office, Office Action for Japan patent application No. 2013-518244, Mar. 15, 2016, Japan.

* cited by examiner (a)

(b)

(a)    (b)

CLASSIC  　　　　　　　　　DANCE

클래식  　　　　　　　　　댄스

(a) 　　　　　　　　　(b)

(a)

(b)

(a)

(b)

(c)

(d)

(a)

(b)

(a)

(b)

PHOTONIC CRYSTAL MODE

METHOD FOR TUNING COLOR OF A DISPLAY REGION AND APPARATUS THEREOF

PRIORITY

The present application claims priority under 35 U.S.C. §371 to PCT Application PCT/KR2011/004708, filed on Jun. 28, 2011, which claims priority to Korean Patent Application No. 10-2011-0062308, filed on Jun. 27, 2011, to Korean Patent Application No. 10-2011-0062289, filed on Jun. 27, 2011, to Korean Patent Application No. 10-2011-0062211, filed on Jun. 27, 2011, to Korean Patent Application No. 10-2011-0062195, filed on Jun. 27, 2011, to Korean Patent Application No. 10-2011-0032798, filed on Apr. 8, 2011, to Korean Patent Application No. 10-2010-0084951, filed on Aug. 31, 2010, to Korean Patent Application No. 10-2010-0083545, filed on Aug. 27, 2010, to Korean Patent Application No. 10-2010-0078968, filed on Aug. 16, 2010, to Korean Patent Application No. 10-2010-0072061, filed on Jul. 26 , 2010, to Korean Patent Application No. 10-2010-0069531, filed on Jul. 19 , 2010, to Korean Patent Application No. 10-2010-0069530, filed on Jul. 19 , 2010, and to Korean Patent Application No. 10-2010-0062044, filed on Jun. 29, 2010, the disclosures of which are hereby incorporated by reference in their entireties.

BACKGROUND OF THE INVENTION

1. Technical Field

The present invention relates to a method and an apparatus for displaying a surface of a specific apparatus. More specifically, the present invention relates to a technology field capable of variably and continuously changing a color of a surface of a specific object or apparatus according to user's desire, environment or external conditions using an apparatus.

2. Description of the Related Art

Regarding recent electronic apparatus, besides a functional function of achieving an original objective of the apparatus, a function of stimulating consumer's emotion such as a design and an appearance or the like has been illuminated. In addition, there has been increased a demand for products of which the appearance or the surface can be changed according to the user's desire or demand, a state of the corresponding products or external environments. Meanwhile, in the products with the changed surface color or transmittance of light, a demand for a simple color implementation method, an apparatus implementation method, a large-area display method, a low-cost display method, a low-power display method, a display method capable of using a flexible substrate that may be bent in terms of a design, or the like, have been gradually increased. Therefore, a need exists for an apparatus or products having an appearance, a frame or a surface of which the color or the transmittance is continuously changed according to the user's desire, the state of the corresponding product or object, or the external conditions, while satisfying all the demands.

SUMMARY OF THE INVENTION

In products having a surface of an appearance or a frame of which the color or the transmittance of light is changed, a demand has been gradually increased for a simple color implementation method, a continuous color implementation method, a large-area display method, a low-cost display method, a low-power display method, a display method capable of using a flexible m substrate that may be bent in terms of a design. Therefore, the present invention has been made in an effort to provide an apparatus or products having an appearance, a frame, or a surface of which the color or transmittance is continuously changed according to the user's desire, the state of the corresponding product or object, or the external conditions, while satisfying all the demands.

The present invention provides a method of changing color or transmittance of light on a surface part of an object. The surface part of the object includes a solvent and a plurality of particles dispersed in the solvent, and when electric field is applied to the solvent and the plurality of particles, the transmittance of color or light on the surface part of the object is changed due to the change of the inter-particle distances or the positions of the particles according to the magnitude, direction, application time or application frequency of electric field, wherein the magnitude, direction, application time or application frequency of electric field are changed by the association of the input signal by the user of the object or the signal acquired by the object or the signal acquired by the sensing unit provided to the object.

The present invention provides an apparatus including a surface part. The surface part of the apparatus includes a solvent and a plurality of particles dispersed in the solvent, and when electric field is applied to the solvent and the plurality of particles, the transmittance of color or light on the surface part of the apparatus is changed due to the change of the inter-particle distances or the positions of the particles according to the magnitude, direction, application time or application frequency of electric field, wherein the magnitude, direction, application time, or application frequency of electric field are changed by the association of the input signal by the user of the apparatus or the signal acquired by the object or the signal acquired by the sensing unit provided to the apparatus.

The present invention provides a display apparatus. The display apparatus includes a sample region display unit displaying at least one sample color, an object region display unit displaying color corresponding to color selected by a user among at least one sample color on object region, and a control unit acquiring an input signal for selecting any one of at least one sample color displayed on the sample region and generating a control signal for a color displayed on the object region by referring to the acquired input signal, wherein at least of the sample region display unit and the object region display unit applies electric field to the plurality of particles and solvent and controls at least one of the intensity and direction of the electric field to control the inter-particle distance, thereby variably displaying the color of light reflected from the particles.

The present invention provides a display apparatus. The display apparatus includes at least one sensing unit, an object region display unit variably displaying a color of any wavelength on an object region, and a control unit acquiring an input signal on information sensed by at least one sensing unit and generating a control signal for a color displayed on the object region by referring to the acquired input signal, wherein at least of the sample region display unit and the object region display unit applies electric field to the plurality of particles and solvent and controls at least one of the intensity and direction of the electric field to control the inter-particle distance, thereby variably displaying the color of light reflected from the particles.

According to one aspect of the present invention, there is provided a method including: acquiring information sensed by using at least one sensing unit; generating a voltage signal based on the acquired information; displaying by visually tuning at least one of color and transmittance of the display region of the object based on the generated voltage signal, wherein, in the displaying, a solution, which comprises a solvent and a plurality of particles dispersed in the solvent, is provided between two or more electrodes in which one of the electrodes is transparent, and the solution shows a variable electrical polarization characteristic, in which an induced electrical polarization quantity is changed according to the change in electric field, and at least one of the color and the transmittance of the display region of the object is variably tuned by applying electric field corresponding to the voltage signal between the electrodes to which the solution is provided, and tuning at least one of the intensity and direction of the electric field to control the inter-particle distances or the positions of the particles.

The displaying may includes variably tuning the color of the display region of the object by controlling the inter-particle distances so as to change a wavelength of light reflected from the particles.

At the displaying, the wavelength of the reflected light may be changed continuously or in an analog manner.

At the displaying, the wavelength of the reflected light may be changed continuously or in the analog manner within a single pixel of the display region.

The acquiring of the information may include acquiring surrounding environment information of the object.

The acquiring of the information may be performed by the user of the object.

The acquiring of the information may be performed by displaying sample colors that gradually change on a sample region and by allowing a user to select at least one color of the sample colors displayed on the sample region.

The particles may have an electric charge of the same sign, and as the electric field is applied, the inter-particle distances may reach a specific range by an interaction electrophoretic force that is applied to the particles in proportional to the intensity of electric field, electrostatic attraction that is applied between the particles by the variable electric polarization characteristic and electrostatic repulsion that is applied between the particles having the electric charge of the same sign, and thus, as the inter-particle distances reach the specific range, light having a specific wavelength is reflected from the plurality of particles.

The plurality of particles may show a steric effect, and as the electric field is applied, the inter-particle distances may reach the specific range by an interaction of the electrostatic attraction that is applied between the particles by the variable electric polarization characteristic and the steric hindrance repulsion, and thus, as the inter-particle distances reach the specific range, light having a specific wavelength is reflected from the plurality of particles.

The solution may have a variable electric polarization characteristic by any one of electronic polarization, ionic polarization, interfacial polarization and rotational polarization.

The solution may be a gel type.

After a predetermined color is displayed on the display region by applying the electric field, the solution may maintain the predetermined color for predetermined time although the electric field is removed.

The electric field may use DC voltage or AC voltage including DC voltage component.

When the electric field is applied, the particles may be arranged three-dimensionally with having short range ordering within the solvent.

The color or the transmittance of the display region may be tuned by applying the electric field only to the specific portion of the electrode to move the particles to the specific portion of the electrode According to one aspect of the present invention, there is provided an apparatus, which includes an information acquisition unit acquiring information sensed by using at least one sensing unit; a voltage signal generator generating a voltage signal based on the acquired information; and a display unit variably tuning at least one of color and transmittance based on the generated voltage signal, wherein the display unit comprises a solution, which is comprised of a solvent and a plurality of particles dispersed in the solvent and is provided between two or more electrodes in which one of the electrodes is transparent, the solution shows a variable electrical polarization characteristic, in which an induced electrical polarization quantity is changed according to the change in electric field, and at least one of the color and the transmittance of the display region of the object is tuned by applying electric field corresponding to the voltage signal between the electrodes to which the solution is provided and controlling at least one of the intensity and direction of the electric field to control the inter-particle distances or the positions of the particles.

The display unit may variably tune the color of the display region of the object by controlling the inter-particle distances so as to change a wavelength of light reflected from the particles.

The wavelength of the light reflected from the display unit may be changed continuously or in an analog manner.

The wavelength of the light reflected from the display unit may be changed continuously or in an analog manner within a single pixel of the display unit.

The apparatus may further include an emissive display apparatus.

The apparatus may further include a solar cell.

The display unit may cover at least a part of the surface of the apparatus.

Furniture according to one aspect of the present invention may include the above apparatus and is disposed with the display unit to cover at least a portion of the exterior region and display on the display unit a color selected by a user.

An electronic apparatus according to one aspect of the present invention may include the above apparatus and displays on the display unit a color corresponding to the information on the charging state of the battery, wherein the information on a charging state of a battery includes at least one of the charge amount, current value and voltage value of the battery.

A terminal apparatus according to one aspect of the present invention may include the above apparatus and provides information on contents to a user of the terminal apparatus, and displays on the display unit a color based on information on contents, wherein the information include at least one of a type and a content of the contents, contents of a web site and a caller of received call.

A disguising apparatus according to one aspect of the present invention may include the above apparatus and displays on the display unit a color corresponding to the information on the image of the surrounding environment, wherein the information on the image of the surrounding environment includes information on at least one of color, pattern and brightness of the image of the surrounding environment.

An acoustic apparatus according to one aspect of the present invention may include the above apparatus and displays on the display unit a color corresponding to the information on the sound, wherein the information on the sound includes intensity, frequency, rhythm, tune, beat and genre of the sound.

A diagnosis apparatus according to one aspect of the present invention may include the above apparatus and displays on the display unit a color corresponding to information on a body state, wherein the information on the body state includes at least one of heart rate, blood pressure, body temperature and brain wave.

A watch apparatus according to one aspect of the present invention may include the above apparatus and displays on the display unit a color corresponding to the information on at least one of the time or the hour.

An electric heat apparatus according to one aspect of the present invention may include the above apparatus and displays on the display unit a color corresponding to color the surrounding temperature or the temperature of the electric heat apparatus.

A humidifying apparatus according to one aspect of the present invention may include the above apparatus and displays on the display unit a color corresponding to color based on the information on the surrounding humidity.

A transfer apparatus according to one aspect of the present invention may include the above apparatus and displays on the display unit a color corresponding to information on information on a transfer state, wherein the information on the transfer state includes at least one of velocity, acceleration, angular velocity and angular acceleration.

As set forth above, the embodiments of the present invention can implement the structural color of the full color continuously or in the analog manner by controlling the wavelength of light reflected from the particle.

Further, the embodiments of the present invention can implement the color within the single pixel continuously or in the analog manner, thereby simply implementing more various colors than the existing method of mixing R, G and B. In detail, the existing method implements various colors by mixing colors among three pixels corresponding to, for example, R, G and B, while the embodiments of the present invention can implement various colors with only the single pixel.

In addition, the embodiments of the present invention can display the selected sample colors on the object region corresponding to at least any one selected from the sample colors displayed on the sample region, thereby providing the user interface enabling the user to intuitively control the colors of light reflected from the photonic crystal.

Further, the embodiments of the present invention can display the colors corresponding to the sensing information acquired from various sensing units on the object region, thereby visually represents a variety of sensing information by using the colors of light reflected from the photonic crystal.

In addition, the embodiments of the present invention can provide products having an appearance, a frame, or a surface of which the color or the transmittance of light is changed, in which the surface of the appearance or the frame of which the color or the transmittance is changed according to the user's desire, the state of the corresponding product or object, or the external conditions, while implementing the simple color implementation, the continuous color implementation, the large-area display, the low-cost display, the low-power display, the display capable of using the flexible substrate that may be bent in terms of the design.

Moreover, one embodiment of the present invention can implement the appearance, the surface, or the frame capable of implementing the colors of the entire range in the analog manner, that is, continuously, without implementing the colors due to the mixing of the R, G and B as the existing digital method.

In addition, one embodiment of the present invention can implement the display of the appearance or the surface with the excellent viewing angle characteristic.

BRIEF DESCRIPTION OF THE DRAWINGS

The above and other objects and features of the present invention will become apparent from the following description of the preferred embodiments, given in conjunction with the accompanying drawings, in which.

DESCRIPTION OF THE PREFERRED EMBODIMENTS

Figure 1:
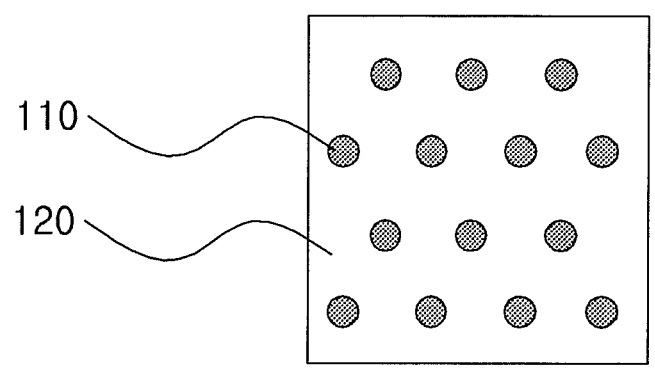
FIGS. 1 and 2 are diagrams illustrating a configuration of particles included in a display apparatus in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different from one another, are not necessarily mutually exclusive. For example, a particular feature, structure and characteristic described herein in connection with one embodiment may be implemented within other embodiments without departing from the spirit and scope of the present invention. Also, it is to be understood that the locations or arrangements of individual elements in the embodiment may be changed without separating the spirit and scope of the present invention. The following detailed description is, therefore, not to be taken in a limiting sense, and the scope of the invention is defined only by the appended claims that should be appropriately interpreted along with the full range of equivalents to which the claims are entitled. In the drawings, like reference numerals identify identical or like elements or functions through the several views. In the specification, "one embodiment" means that components, shapes, characteristics, principles or the like used in the corresponding embodiment may also be used in the other embodiments.

Hereinafter, the configuration of the present invention will be described in detail with reference to the accompanying drawings so that those skilled in the art can easily carry out the present invention.

[Configuration of Display Apparatus]

A display apparatus according to one embodiment of the present invention has a main technical characteristics in that the inter-particle distances are controlled by applying electric field, in a state that a plurality of particles having electric charges are dispersed in a solvent having electrical polarization characteristic or in a state that the plurality of particles having electric charges and the electrical polarization characteristic are dispersed in the solvent, so as to use photonic crystal characteristic, thereby implementing a display of full color. In addition, according to one embodiment of the present invention, both of the plurality of particles and the solvent may have the electrical polarization characteristic. In this case, the inter-particle distances may be more reliably controlled. The electrical polarization characteristic may be implemented when electric field is applied, and the case in which a total of electrical polarization quantity is increased upon application of the electric field may be advantageous in one embodiment of the present invention. Such an electrical polarization characteristic will be described in detail below.

[Composition of Particles and Solvent]

Figure 2:
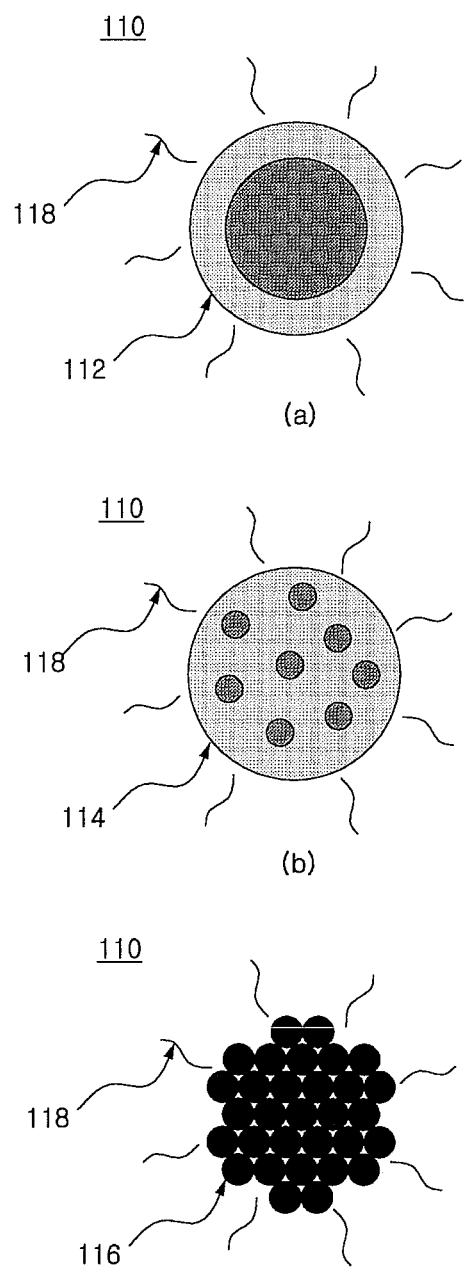

FIGS. 1 and 2 are diagrams illustrating a configuration of particles included in a display apparatus in accordance with one embodiment of the present invention.

First, referring to FIG. 1, particles 110 in accordance with one embodiment of the present invention may be present while being dispersed in a solvent 120. In accordance with one embodiment of the present invention, the particles 110 may have positive charges or negative charges. Therefore, when electric field is applied to the particles 110, the particles 110 may be moved (that is, electrophoresis may be induced) due to electrical attraction generated by electric charges and electric field of the particles 110. In addition, when the plurality of particles 110 has electric charges of the same sign, the plurality of particles 110 may be arranged so as to maintain a predetermined distance without contacting each other due to electrical repulsion therebetween by the electric charges of the same sign. Meanwhile, a diameter of the particles 110 may be several nm to several hundreds of μm, but is not necessarily limited thereto.

Referring to FIG. 2, the particles 110 in accordance with one embodiment of the present invention may have a core-shell configuration 112 made from different types of materials as shown in FIG. 2(a), a multi-core configuration 114 made from different kinds of materials as shown in FIG. 2(b), or a cluster structure 116 made from a plurality of nano-particles as shown in FIG. 2(c), wherein a charge layer 118 having electric charges may be configured to have a structure enclosing the particles.

More specifically, the particles 110 in accordance with one embodiment of the present invention may be made of elements, such as silicon (Si), titanium (Ti), barium (Ba), strontium (Sr), iron (Fe), nickel (Ni), cobalt (Co), lead (Pb), aluminum (Al), copper (Cu), silver (Ag), gold (Au), tungsten (W), molybdenum (Mo), zinc (Zn), zirconium (Zr) or the like, or a compounds including the same. In addition, the particles 110 in accordance with one embodiment of the present invention may be made of polymer materials such as polystyrene (PS), polyethylene (PE), polypropylene (PP), polyvinyl chloride (PVC), polyethylene terephthalate (PET) or the like. In addition, the particles 110 in accordance with one embodiment of the present invention may be made by coating particles or clusters having no electric charge with a material having electric charges. Examples of these particles may include particles whose surfaces are processed (or coated) with an organic compound having a hydrocarbon group; particles whose surfaces are processed (or coated) with an organic compound having a carboxylic acid group, an ester group and an acyl group; particles whose m surfaces are processed (or coated) with a complex compound containing halogen (F, Cl, Br, I, etc.) elements; particles whose surfaces are processed (coated) with a coordination compound containing amine, thiol and phosphine; and particles having electric charges generated by forming radicals on the surfaces. As described above, the surface of the particles 110 is coated with materials such as silica, polymer, monomer, etc., such that the particles 110 may have high dispersibility and stability within the solvent 120.

In accordance with one embodiment of the present invention, the solvent 120 may be made of materials having a specific gravity similar to the particles 110 so that the particles 110 may be uniformly dispersed in the solvent 120 and may be made of materials appropriate for the particles 110 to stably disperse within the solvent 120. For example, an example of the material may include halogen carbon oil, dimethyl silicon oil or the like, having low permittivity.

In addition, in accordance with one embodiment of the present invention, in order to effectively indicate the photonic crystal characteristic by maintaining the particles 110 in a stable colloidal state without being precipitated within the solvent 120 to be described below, a value of the electrokinetic potential (that is, zeta potential) of the colloidal solution made of the particles 110 and the solvent 120 may be a predetermined value or more, a difference in the specific gravity between the particles 110 and the solvent 120 may be a predetermined value or less, and a difference in a refractive index between the solvent 120 and the particles 110 may be a predetermined value or more. For example, an absolute value of the electrokinetic potential of the collide solution may be 10 mV or more, the difference in specific gravity between the particles 110 and the solvent 120 may be 5 or less, and the difference in the refractive index between the particles 110 and the solvent 120 may be 0.3 or more.

Meanwhile, in accordance with one embodiment of the present invention, the particles 110 may be configured to have a unique color, thereby reflecting light having a specific wavelength. More specifically, the particles 110 in accordance with one embodiment of the present invention may have a specific color through an oxidation state control or a coating such an inorganic pigment, pigment, etc. For example, as the inorganic pigments coated on the particles 110 in accordance with one embodiment of the present invention, Zn, Pb, Ti, Cd, Fe, As, Co, Mg, Al, etc. including chromophore may be used as a form of oxide, emulsion and lactate, and as the dyes coated on the particles 110 in accordance with one embodiment of the present invention, a fluorescent dye, an acid dye, a basic dye, a mordant dye, a sulfur dye, a vat dye, a disperse dye, a reactive dye, etc. may be used. In addition, in accordance with one embodiment of the present invention, the particles 110 may be made of a material having a specific structural color so as to display a specific color. For example, the particles such as oxide silicon (SiOx), oxide titanium (TiOx), etc. may be made of materials that are configured to be uniformly arranged in media having different refractive indices at a predetermined distance so as to reflect light having a specific wavelength.

Further, in accordance with one embodiment of the present invention, the solvent 120 may also be configured to reflect light having a specific wavelength, that is, to have a unique color. More specifically, the solvent 120 in accordance with one embodiment of the present invention may include materials having pigments, dyes or materials having a structural color by the photonic crystal.

[Electrical Polarization Characteristic of Particles and Solvent]

In addition, in accordance with one embodiment of the present invention, the solution including the solvent, in which the particles included in the display apparatus are dispersed, may have the electrical polarization characteristic (i.e., the electrical polarization is changed according to the application of the electric field). In the electrical polarization characteristic of the solution, at least one of the particles or the solvent configuring the solution may indicate the electrical polarization characteristic, or the electrical polarization characteristic may be indicated by an interaction between the particles and the solvent within the solution. Further, the solution (composed of the particles and the solvent) indicating the electrical polarization characteristic may include a material which is electrically polarized with any one of electronic polarization, ionic polarization, interfacial polarization or rotational polarization due to asymmetrical charge distribution of atoms or molecules as an external electric field is applied. Therefore, at least one of the particles or the solvent in accordance with one embodiment of the present invention may cause the electrical polarization when the electric field is applied, and an amount of the electrical polarization of at least one of the particles and the solvent may be changed as the intensity or direction of the electric field applied to the particles or the solvent is changed. The characteristics of changing the electrical polarization according to the change in the electric field may be called as the variable electrical polarization characteristic. The larger electrical polarization generated the better when the electric field is applied. The reason is that the inter-particle distances may be more uniformly arranged.

Figure 3:
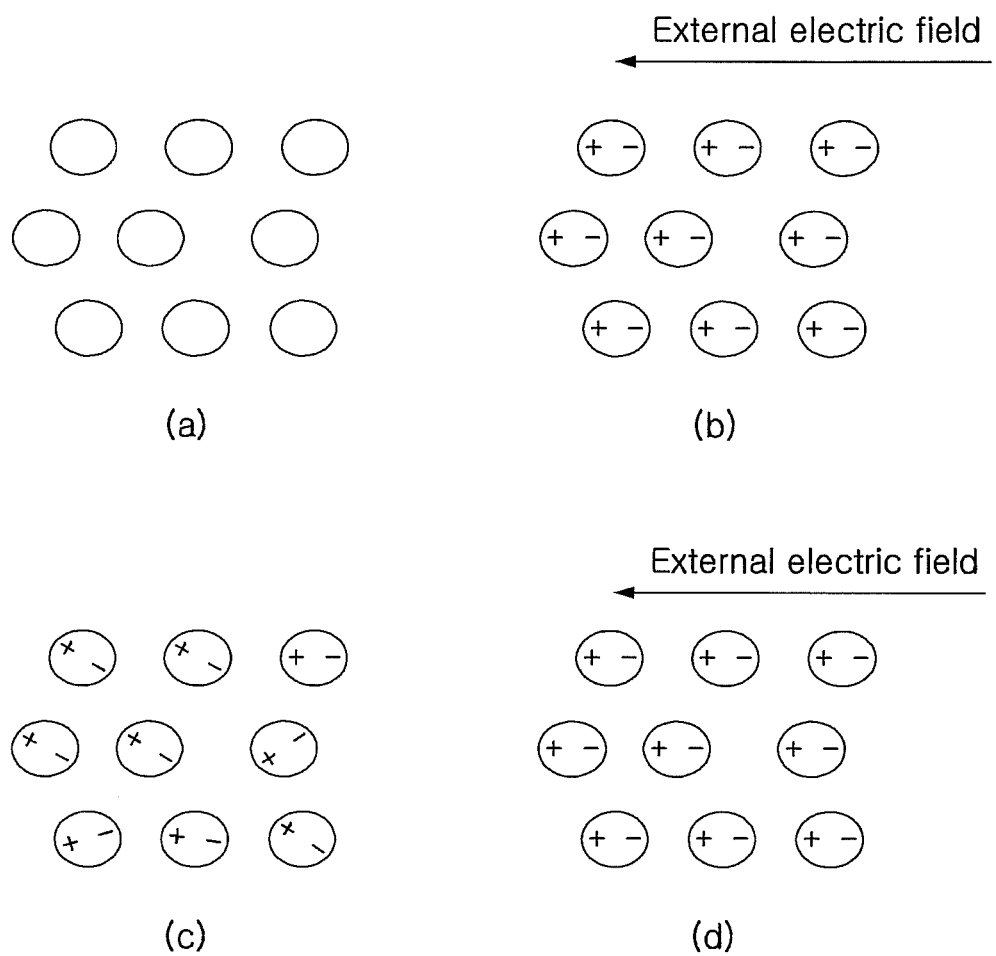
FIG. 3 is a diagram illustrating a configuration of polarization of particles or a solvent upon application of an electric field in accordance with one embodiment of the present invention.

FIG. 3 is a diagram exemplarily illustrating a configuration of polarization of particles or a solvent upon application of an electric field in accordance with one embodiment of the present invention.

Referring to FIGS. 3(a) and 3(b), when the external electric field is not applied, the particles or the solvent maintain an electrical equilibrium state, but when the external electric field is applied, the electrical polarization characteristic is generated as the electric charges within the particles or the solvent move in a predetermined direction, thereby electrically polarizing the particles or the solvent. FIGS. 3(c) and 3(d) show the case in which the unit polarization is generated by electrically asymmetric components composing the particles or the solvent. If no external electric field is applied, the unit polarization is arranged chaotically, such that the whole electrical polarization is not shown or shows a small value. Whereas, if the external electric field is applied, the particles or the solvent having the unit polarization may be re-arranged in a predetermined direction along the direction of the external electric field, and thus, may show a relatively large polarization value as compared with the case of FIGS. 3(a) and 3(b). In accordance with one embodiment of the present invention, the unit polarization shown in FIGS. 3(c) and 3(d) may occur in the asymmetrical arrangement of electrons or ions, or the asymmetrical structure of molecules. Even when no external electric field is applied, a very small remnant polarization value may be shown due to this unit polarization.

Figure 4:
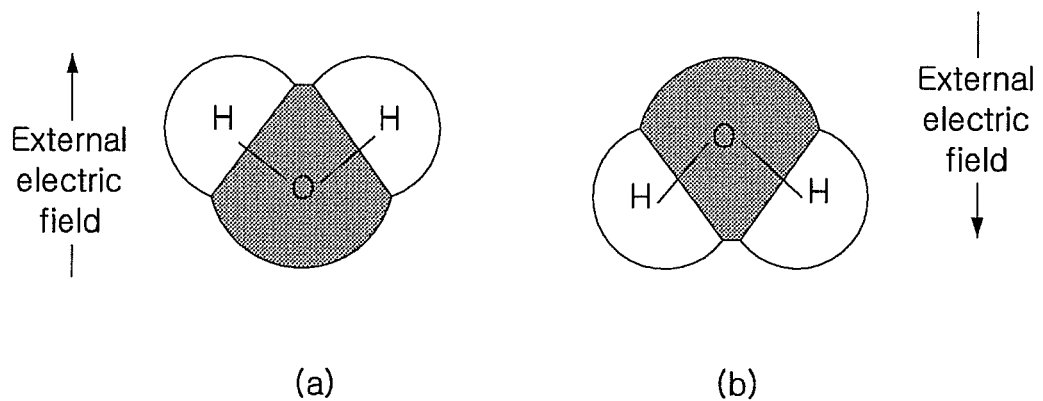
FIG. 4 is a diagram illustrating unit polarization characteristic by an asymmetrical arrangement of molecule in accordance with one embodiment of the present invention.

FIG. 4 is a diagram exemplarily illustrating unit polarization characteristic by an asymmetrical arrangement of molecule in accordance with one embodiment of the present invention. More specifically, FIG. 4 illustrates the case of water molecules (H2O). In addition to the water molecules, trichloroethylene, carbon tetrachloride, di-iso-propyl ether, toluene, methyl-t-butyl ether, xylene, benzene, diethyl ether, dichloromethane, 1,2-dichloroethane, butyl acetate, iso-propanol, n-butanol, tetrahydrofuran, n-propanol, chloroform, ethyl acetate, 2-butanone, dioxane, acetone, methanol, ethanol, acetonitrile, acetic acid, dimethylformamide, dimethyl sulfoxide, propylene carbonate, N,N-Dimethylformamide, Dimethyl Acetamide, N-Methylpyrrolidone, etc. may be employed as the material constituting the particles or solvent because they represent the unit polarization characteristic due to the asymmetry of a molecular structure. For reference, the polarity index used to compare the polarization characteristics of the material may be indices indicating the relative polarization degree of the corresponding material to the polarization characteristic of $H_2O$.

Figure 5:
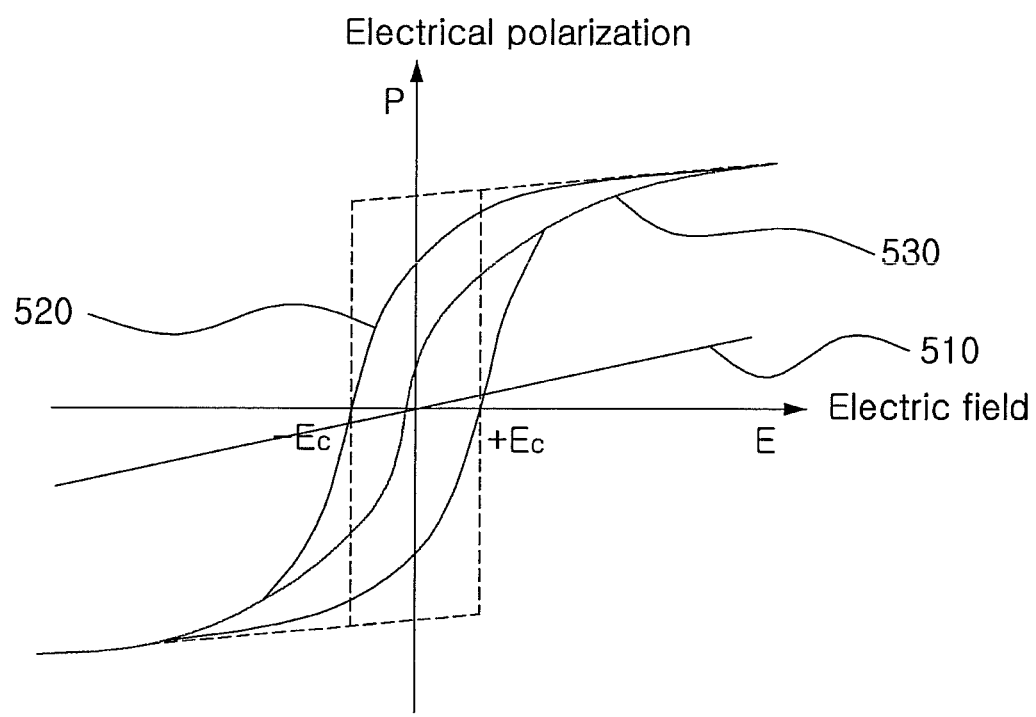
FIG. 5 is a diagram illustrating hysteresis curves of a paraelectric material, a ferroelectric material and a superparaelectric material.

Further, the particles or the solvent in accordance with one embodiment of the present invention may include a ferroelectric material that shows the increased polarization as the external electric field is applied, shows the large remnant polarization even when the external electric field is not applied, and has remnant hysteresis; and a superparaelectric material that has an increased polarization as the external electric field is applied, does not show the remnant polarization when the external electric field is not applied, and does not have hysteresis. Referring to FIG. 5, it can be seen that there are hysteresis curves a paraelectric material 510, the ferroelectric material 520 and the superparaelectric material 530 according to the external electric fields.

Further, the particles or solvent in accordance with one embodiment of the present invention may include a material having a perovskite structure. Examples of materials having a perovskite structure, such as $ABO_3$, may include materials such as $PbZrO_3$, $PbTiO_3$, $Pb(Zr,Ti)O_3$, $SrTiO_3$ $BaTiO_3$, $(Ba, Sr)TiO_3$, $CaTiO_3$, $LiNbO_3$, etc.

Figure 6:
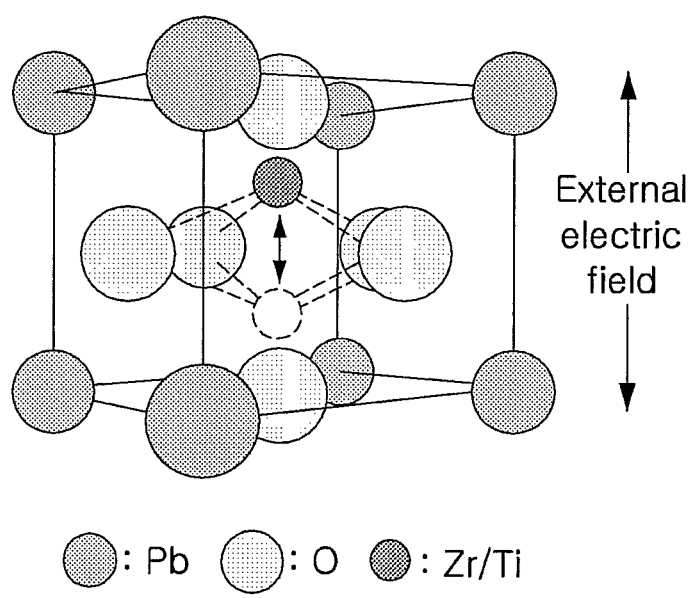
FIG. 6 is a diagram illustrating a material having a perovskite structure that may be included in the particles or the solvent in accordance with one embodiment of the present invention.

FIG. 6 is a diagram illustrating a material having a perovskite structure that may be included in the particles or the solvent in accordance with one embodiment of the present invention. Referring to FIG. 6, the location of Zr (or Ti) in $PbZrO_3$ (or $PbTiO_3$) (i.e., B in an $ABO_3$ structure) may vary with the direction of the external electric field applied to $PbZrO_3$ (or $PbTiO_3$), and thus, the overall polarity of $PbZrO_3$ (or $PbTiO_3$) may be changed.

Meanwhile, in accordance with one embodiment of the present invention, the solvent may include the polarity index of 1 or more.

In addition, describing an aspect of the electrical polarization, as a first example, at least one of each molecule and each particle of the solvent does not have any electrical polarization when the electric field is not applied, but at least one of each molecule and each particle of the solvent is electrically polarized when the electric field is applied. Thereby, at least one of the total quantity of the electric polarization of the plurality of particles and the total quantity of the electric polarization of the solvent may be increased. In a second example, when the electric field is not applied, at least one of each molecule and each particle of the solvent is electrically polarized, but at least one of the total quantity of the electrical polarization of the solvent and the total quantity of the electrical polarization of the plurality of particles becomes zero, while when the electric field is applied, at least one of the total quantity of the electric polarization of the plurality of particles and the total quantity of the electric polarization of the solvent may be increased. In a third example, when the electric field is not applied, at least one of each molecule and each particles of the solvent is electrically polarized, but at least one of the total quantity of the electrical polarization of the solvent and the total quantity of the electrical polarization of the plurality of particles has a first value, which is not zero, while when the electric field is applied, at least one of the total quantity of the electric polarization of the plurality of particles and the total quantity of the electric polarization of the solvent may have a second value larger than the first value.

[Steric Hindrance Effect of Particles]

In addition, in accordance with one embodiment of the present invention, in order to generate steric hindrance repulsion among the particles included in the display apparatus, the steric structure may be formed on the surface of the particle. For example, a functional group, a surfactant or the like may be used as the steric structure formed on the surface of the particle.

Further, in accordance with one embodiment of the present invention, the particles include electrically polarized materials and underwent the particle surface treatment. Further, an electrophoretic effect may be minimized due to the weakly charged electric charges even though the inter-particle steric hindrance repulsion is present, such that the particles or the solutions have the electrical polarization changed according to the external electric field, thereby effectively generating the inter-particle short range attraction. Further, the inter-particle short range steric hindrance repulsion is effectively generated by the steric structure formed through the particle surface treatment. However, a phenomenon that the particles charged by the long range electrophoretic force due to the external electric field are collected to the electrode may be minimized. That is, the electric charges on the surface of the particles are not treated, such that the electrophoretic phenomenon of collecting the particles to any one electrode by the external electric field may be minimized. In order to give the steric hindrance repulsion, an organic ligand may be treated on the surface of the particles.

However, a composition of the particles and the solvent in accordance with one embodiment of the present invention is not limited to the above list and therefore, may be appropriately changed within the range capable of achieving the object of the present invention, that is, within the range in which the inter-particle distances may be controlled by the electric field.

[Operation Principle and Configuration of Display Apparatus]

Meanwhile, in accordance with one embodiment of the present invention, when a plurality of particles having electric charges of the same sign are dispersed in a solvent having electrical polarization characteristic, if an electric field is applied to the particles and the solvent, electrical attraction proportional to the intensity of the electric field and the charge amount of the particles acts on the particles due to the electric charges of the particles. Therefore, the plurality of particles moves in a predetermined direction by electrophoresis, thus narrowing the inter-particle distances. Meanwhile, in contrast, electrical repulsion generated between the particles having the electric charges of the same sign increases as the inter-particle distances become smaller, resulting in a predetermined equilibrium state while preventing the inter-particle distances from continuing to decrease. Therefore, the plurality of particles may be regularly arranged at a predetermined distance. Further, the unit polarized solvent is arranged in a predetermined direction by the externally applied electric field and the electric charges of the peripheral particles due to the electric polarization characteristic of the solvent. Therefore, the polarization region is locally formed based on the particles, such that the particles may be more regularly and stably arranged while maintaining the predetermined distance. That is, in accordance with one embodiment of the present invention, the plurality of particles can be regularly arranged at distances where the electrical attraction due to an external electric field, the electrical repulsion between the particles having electric charges of the same sign, and the electrical attraction due to the polarization are in an equilibrium state. According to the above principle, the inter-particle distances can be controlled at predetermined levels, and the particles arranged at predetermined distances can function as photonic crystals. Since the wavelength of light reflected from the regularly arranged particles is determined by the inter-particle distances, the wavelength of the light reflected from the particles can be arbitrarily controlled by controlling the wavelength of light reflected from the plurality of particles according to the control of the inter-particle distances. Here, a pattern of the wavelength of reflected light may be diversely represented by the factors, such as the intensity and direction of the applied electric field, the size and mass of the particles, the refractive indices of the particles and the solvent, the charge amount of the particles, the electrical polarization characteristic of the solvent, the concentration of the particles dispersed in the solvent, etc.

Figure 7:
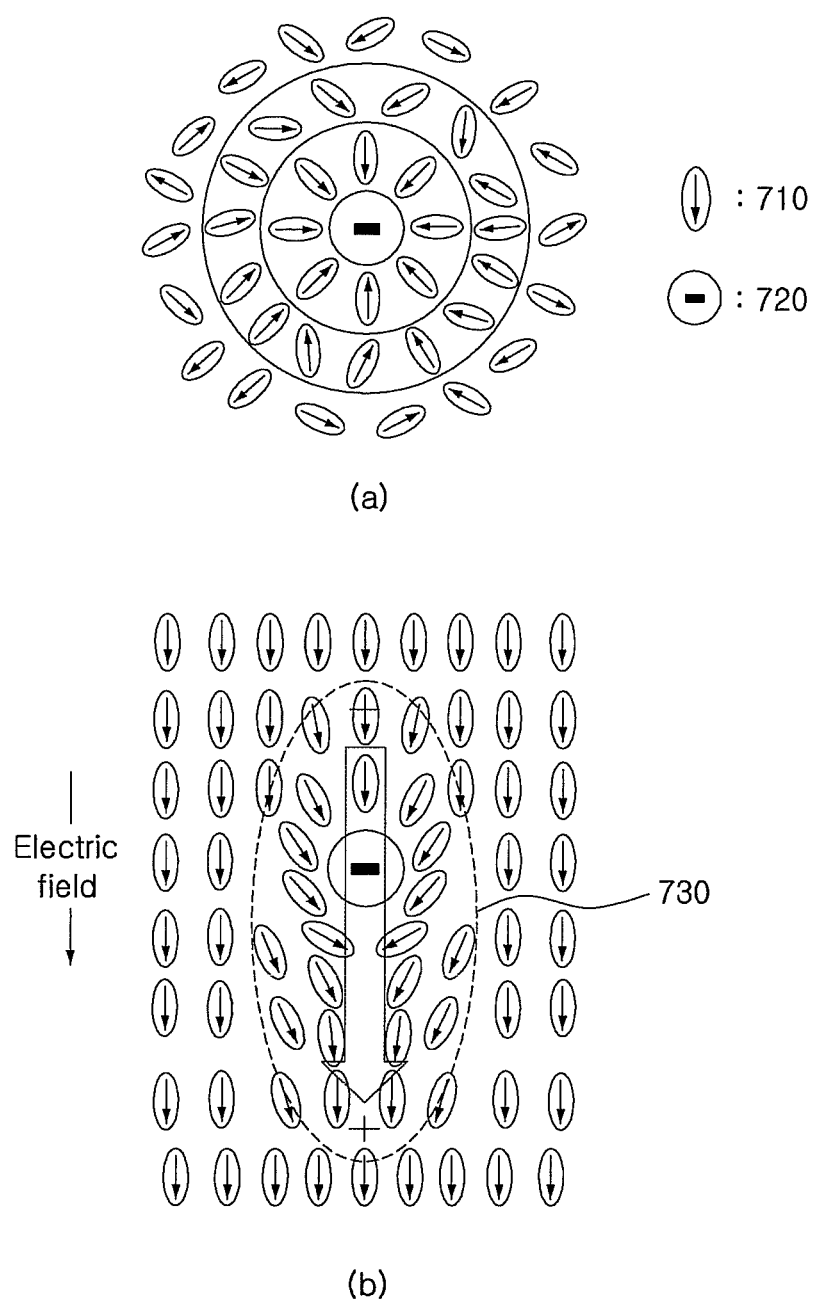
FIG. 7 is a diagram conceptually illustrating a configuration of controlling the inter-particle distances in accordance with one embodiment of the present invention.

FIG. 7 is a diagram conceptually illustrating a configuration of controlling the inter-particle distances in accordance with one embodiment of the present invention. Referring to FIG. 7, if no external electric field is applied, unit polarized solvent 710 near a particle 720 having an electric charge can be intensively arranged in the direction of the particle by the interaction with the electric charge of the particle, and the unit polarized solvent 710 can be arranged more chaotically or randomly as its distance from the charged particle increases (See FIG. 7(a)). In addition, referring to FIG. 7, when the external electric field is applied, the unit polarized solvent 710 disposed in the region (that is, the region spaced apart from the particle 720) that is not affected by the electric charge of the particle 720 may be rearranged in the direction of the electric field, while the unit polarized solvent 710 disposed in the region (that is, a region close to the particle 720) that is strongly affected by the electrical attraction due to the electric charge of the particle 720 may be arranged in a direction in which the positive pole or the negative pole of the unit polarization is toward the particle 720 due to the electrical attraction by the electric charge of the particle 720. As such, the region in which the unit polarized solvent 710 of the peripheral region of the particle 720 is arranged toward the particle 720, that is, the polarization region 730 acts like one large electrically polarized particle and interacts with the surrounding other polarization regions, such that the particle 720 having the electric charge may be regularly arranged while maintaining the predetermined distance (see FIG. 7(b)). FIG. 7 shows a solvent having a remnant polarization. However, it may be also applied to a solvent that has an electrical polarization characteristic induced by the application of the electric field even in the state with no remnant polarization.

Meanwhile, in accordance with one embodiment of the display apparatus of the present invention, when the plurality of particles having electric charge of the same sign and the electrical polarization characteristic are dispersed in a solvent, if an electric field is applied to the particles and the solvent, the electrical attraction proportional to the intensity of the electric field and the charge amount of the particles acts on the particles due to the electric charges of the particles. Therefore, the plurality of particles moves in a predetermined direction by electrophoresis, thus narrowing the inter-particle distances. Meanwhile, in contrast, electrical repulsion generated between the particles having the electric charges of the same sign increases as the inter-particle distances become smaller, resulting in a predetermined equilibrium state while preventing the inter-particle distances from continuing to decrease. Therefore, the plurality of particles may be regularly arranged at a predetermined distance. In addition, the particles showing the electrical polarization characteristic are polarized by the electric field and are thus polarized in the direction of the electrical field, and thus, the electrical attraction is locally generated among the plurality of polarized particles, such that the particles may be more regularly and stably arranged while maintaining the predetermined distance. That is, in accordance with one embodiment of the present invention, the plurality of particles can be regularly arranged at distances where the electrical attraction due to an external electric field, the electrical repulsion between the particles having electric charges of the same sign, and the electrical attraction due to the polarization are in an equilibrium state. According to the above principle, the inter-particle distances can be controlled at predetermined levels, and the particles arranged at predetermined distances can function as photonic crystals. Since the wavelength of light reflected from the regularly spaced particles is determined by the inter-particle distances, the wavelength of the light reflected from the particles can be arbitrarily controlled by controlling the wavelength of light reflected from the plurality of particles according to the control of the inter-particle distances. Here, a pattern of the wavelength of reflected light may be diversely represented by the factors, such as the intensity and direction of the applied electric field, the size and mass of the particles, the refractive indices of the particles and the solvent, the charge amount of the particles, the electrical polarization characteristic of the particles, the concentration of the particles dispersed in the solvent, etc.

Figure 8:
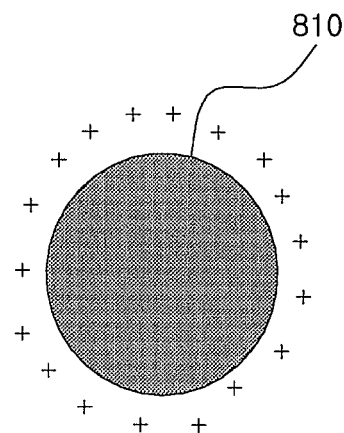
FIG. 8 is a diagram conceptually illustrating a configuration of controlling the inter-particle distances in accordance with one embodiment of the present invention.
Figure 8:
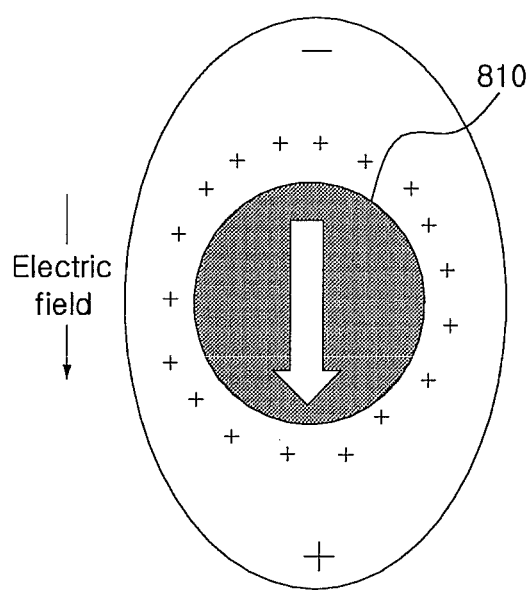

FIG. 8 is a diagram conceptually illustrating a configuration of controlling the interval of the particles in accordance with one embodiment of the present invention. Referring to FIG. 8(a), the particles 810 is not polarized when the external electric field is not applied. Referring to FIG. 8(b), when the external electric field is applied, the particle 810 may be polarized by the material of the electrical polarization characteristic included in the particle 810, such that the particle 810 may be regularly arranged while maintaining the predetermined distance.

In the aforementioned embodiments of the present invention, the greater the electrical polarization values of the solvent or particles, the higher the degree of interaction between the polarization regions 730 or between the polarized particles 810, thereby enabling the particles to be more regularly arranged.

Although the above embodiments describe the case in which the particles or the solvent have the electrical polarization characteristic, it is to be noted that the particles or the solvent in accordance with the embodiments of the present invention do not necessarily have the electrical polarization characteristic. That is, even when the particles or the solvent do not have the electrical polarization characteristic, if the particles have electric charges, the plurality of particles can be regularly arranged at distances where the electrical attraction due to the external electric field and the electrical repulsion between the plurality of particles having electric charges of the same sign are in an equilibrium state. As such, the plurality of regularly arranged particles may form the photonic crystals reflecting light having any wavelength.

In addition, although the above embodiments describe the case in which the particles have electric charges, it is to be noted that the particles in accordance with the present invention does not necessarily have electric charges. That is, even when the particles do not have the electric charges, if the particles have the electric polarization characteristic and have the steric structure that can generate the steric hindrance repulsion, the plurality of particles may be regularly arranged at distances where the electrical attraction between the adjacent particles induced by an external electric field and the repulsion due to the steric effect are in an equilibrium state. As such, the plurality of regularly arranged particles may form the photonic crystals reflecting light having any wavelength. In other words, if the plurality of particles exhibits the mutual steric effect, the electrostatic attraction acting between the particles by the variable electrical polarization characteristic and the steric hindrance repulsion acting between the particles act on each other according to the application of the electric field, such that the inter-particle distances reach a specific range. Therefore, the light having the specific wavelength is reflected from the plurality of particles as the inter-particle distances reach the specific range, thereby implementing the specific hue.

[Operation Principle and Configuration of Display Apparatus]

Figure 9:
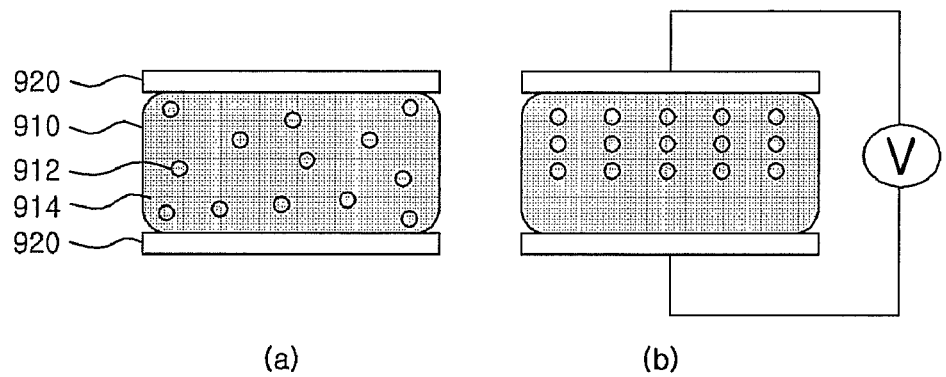
FIG. 9 is a diagram exemplarily illustrating a configuration of a display apparatus in accordance with one embodiment of the present invention.

FIG. 9 is a diagram exemplarily illustrating a configuration of a display apparatus in accordance with one embodiment of the present invention.

Figure 10:
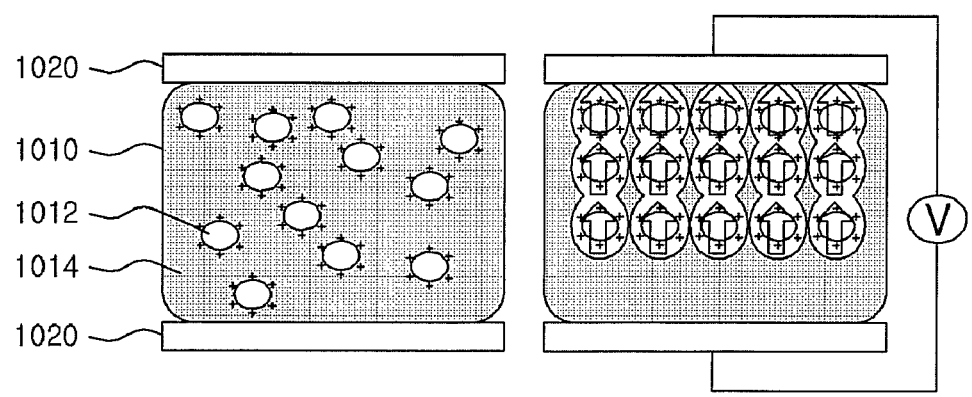
FIGS. 10 and 11 are diagrams conceptually illustrating the configuration of the display apparatus in accordance with the aforementioned embodiments of the present invention.
Figure 11:
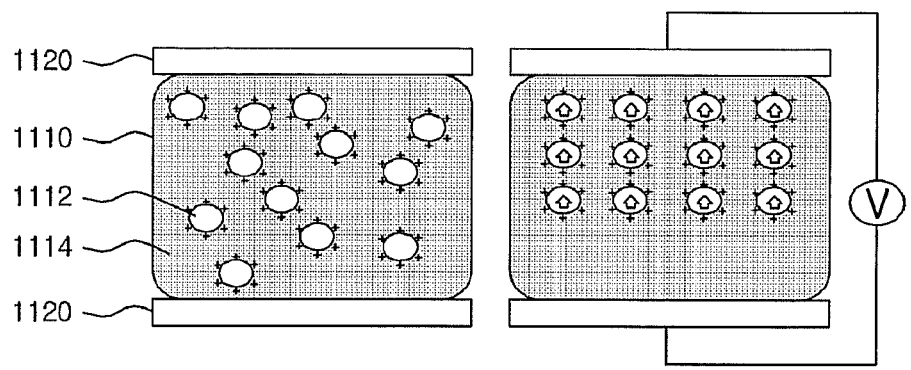

Referring to FIG. 9, a display apparatus 900 in accordance with one embodiment of the present invention may include a display unit 910 and an electrode 920. In more detail, in accordance with one embodiment of the present invention, in the display unit 910, the plurality of particles 912 that have the electric charges of the same sign and the electrical polarization characteristic may be dispersed in the solvent 914. In accordance with another embodiment of the present invention, in the display unit 910, the plurality of particles 912 having the electric charges having the same sign may be dispersed within the solvent 914 having the electrical polarization characteristic. Meanwhile, the configuration of the display apparatus in accordance with one embodiment of the present invention is conceptually shown in FIGS. 10 and 11. The embodiments of the present invention are sufficiently described in detail with reference to FIGS. 7 and 8 and therefore, the additional description of FIGS. 10 and 11 will be omitted. For description, the display unit 910 and the electrode 920 are shown separately, but when the display apparatus is embedded or included in the specific object, the display unit and the electrode are integrated, which may be again referred to as the display unit. That is, there is also a need to consider the configuration in which the display unit includes both of the solution and the electrode.

First, in accordance with one embodiment of the present invention, the display unit 910 serves to reflect light having any wavelength (that is, light of full color when being viewed in the visible ray region) according to the intensity and direction of the applied electric field, which may be performed by controlling the distances of the particles 912 according to the intensity and direction of the electric field applied to the display unit 910 by the principle as described above. That is, as described above, in accordance with one embodiment of the present invention, since the full color may be implemented by controlling the inter-particle distances within the single pixel (the minimum display unit that may be independently controlled), there is no need to implement various colors by mixing colors using three pixels corresponding to R, G and B or three color filters corresponding to R, G and B as in the related art. Therefore, the colors may be very simply implemented, and thus, the configuration of the display apparatus may be very simple. Further, in the related art, since the colors are implemented by mixing colors using pigment particles corresponding to R, G and B, colors that can be implemented are restricted. Above all, the color implementation method is complicated and the configuration of the driving circuit or the display apparatus is complicated. However, one embodiment of the present invention may implement the colors by the simple method, and thus, the configuration of the driving circuit and the display apparatus is not complicated, such that the large economic value may be realized.

Next, in accordance with one embodiment of the present invention, the electrode 920 serves to apply the electric field having the predetermined intensity and direction to the display unit 910, wherein the intensity and direction of electric field applied through the electrode 920 may be appropriately controlled in accordance with the wavelength of light to be reflected from the display unit 910.

Figure 12:
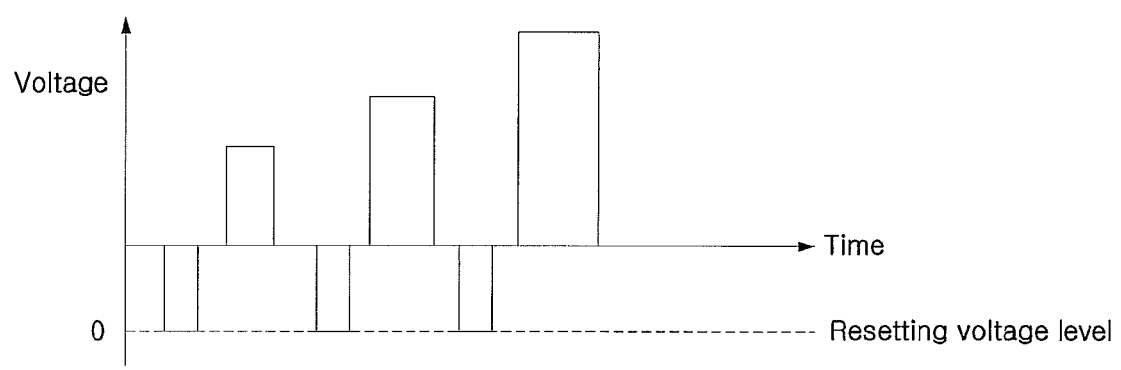
FIGS. 12 to 14 are diagrams exemplarily illustrating a pattern of voltage applied to the display apparatus in accordance with one embodiment of the present invention.
Figure 13:
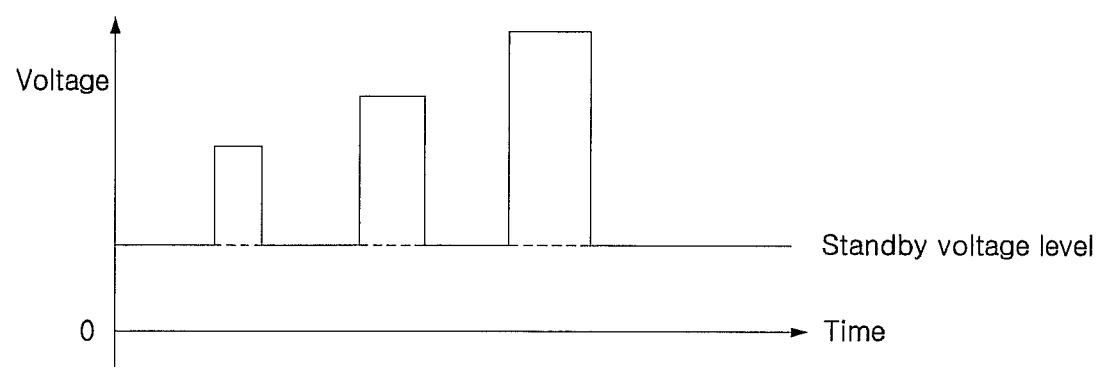
Figure 14:
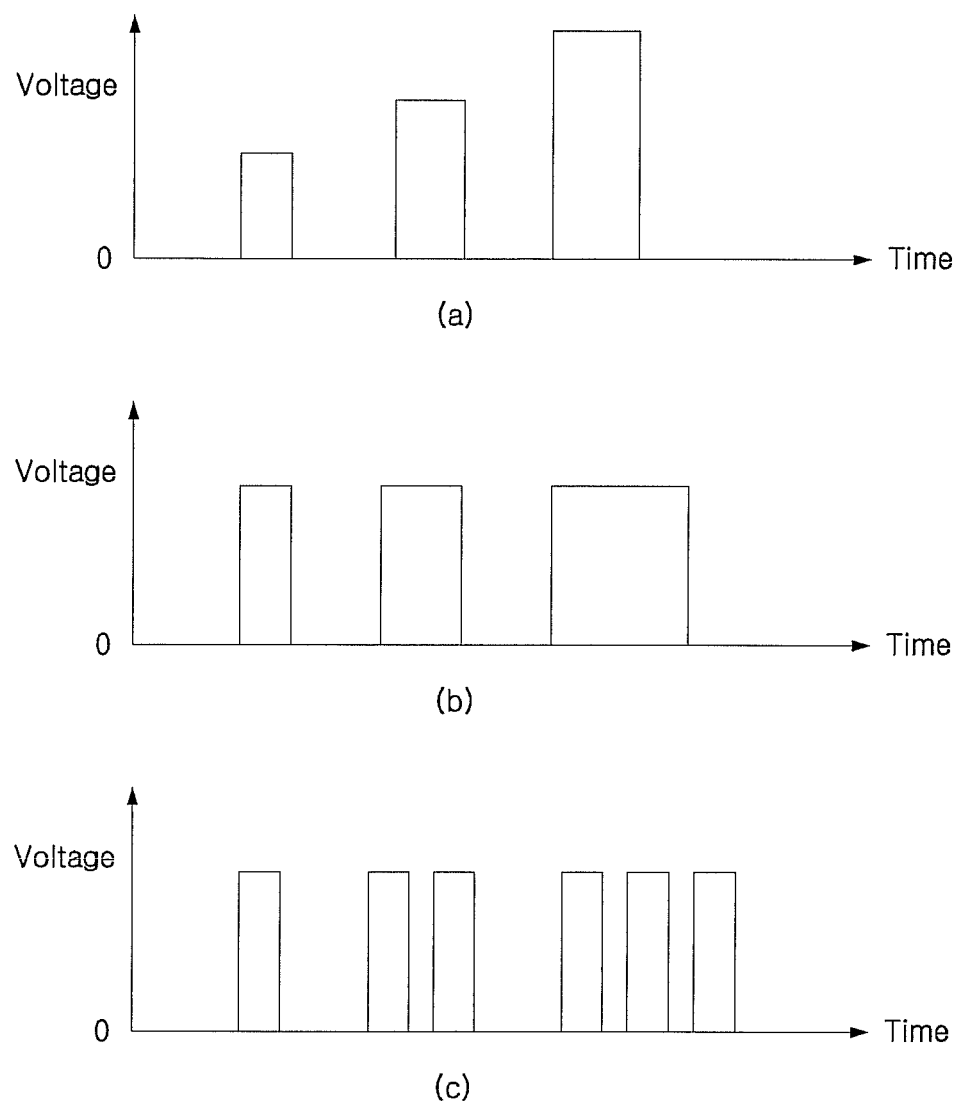

FIGS. 12 to 14 are diagrams exemplarily illustrating a pattern of voltage applied to the display apparatus in accordance with one embodiment of the present invention.

First, referring to FIG. 12, the display apparatus in accordance with one embodiment of the present invention may further include a control unit (not shown) that performs the function of resetting the inter-particle distances at times between the intervals of changing of the intensity and/or direction of an electric field when sequentially applying electric fields of different intensities and/or different directions to the particles and the solvent and thus achieving a continuous display. More specifically, when sequentially applying a first voltage and a second voltage using the electrode applying the electric field to the particles and the solvent, the control unit in accordance with one embodiment of the present invention performs the function of bringing the inter-particle distances, which are arranged at predetermined distances by the first voltage, back to the reset state by applying a reset voltage having the opposite direction to the first voltage to the particles and the solvent before applying the second voltage after the application of the first voltage. Thereby, the display apparatus according to one embodiment of the present invention can improve display performance, including improving the operating speed and suppressing afterimages. Moreover, the reset voltage is applied with the opposite polarity to the just previously applied voltage. Therefore, even when the display apparatus is turned off, the operating speed can be raised by forcibly moving the particles, which are moved and arranged in a predetermined direction by the just previously applied voltage, into the opposite direction.

Next, referring to FIG. 13, the display apparatus in accordance with one embodiment of the present invention may further include a control unit (not shown) that performs the function of maintaining the inter-particle distances in advance to be predetermined distances, location or arrangement when sequentially applying electric fields of different intensities and different directions to the particles and the solvent and achieving a continuous display. More specifically, when sequentially applying a first voltage and a second voltage to the electrode that applies the electric field to the particles and the solvent, the control unit in accordance with one embodiment of the present invention performs the function of rapidly adjusting the inter-particle distances to desired inter-particle distances by applying a predetermined standby voltage in advance and then applying the first voltage or the second voltage. As such, the display apparatus in accordance with one embodiment of the present invention can improve display performance, including increased response speed and faster screen change. That is, in the conventional electronic paper technology, particles of a specific color had to be moved to run through from one end to the opposite end in a cell in order to display a particular color. Contrastingly, in the present invention, photonic crystals can be realized in a manner that a standby voltage having a relatively low level, which is not enough to make reflected light in a visible ray band appear, is applied to condense the particles into one side within the cell, and then a voltage of a specific level or greater is applied to reflect light in the visible ray band. Hence, photonic crystals for reflecting light in the visible ray band can be realized just by moving the particles slightly, thereby making the operating speed of such a display apparatus faster.

Subsequently, referring to FIG. 14, the display apparatus in accordance with one embodiment of the present invention may further include a control unit (not shown) that performs the function of applying an electric field of various patterns of the intensity, duration of application, etc. of the electric field when sequentially applying electric fields of different intensities and/or different directions to the particles and the solvent and achieving a continuous display. More specifically, when applying a voltage using the electric field generating and/or applying unit to the particles and the solvent, the control unit in accordance with one embodiment of the present invention can increase or decrease the level of a voltage to a predetermined voltage (see 14(a)); can extend or reduce the duration or period of application of a certain voltage (see 14(b)); and can obtain the same effect as continuous application of a voltage by repeatedly applying a discontinuous pulse voltage (see 14(c)). By doing so, the display apparatus in accordance with one embodiment of the present invention can improve display performance, including enabling display of various patterns and reducing power consumption.

It should be noted, however, that the application pattern of electric field in accordance with the present invention is not necessarily limited to those listed above, but may be appropriately changed within the scope of the objects of the present invention, i.e., within the scope in which the inter-particle distances can be controlled by an electric field.

Figure 15:
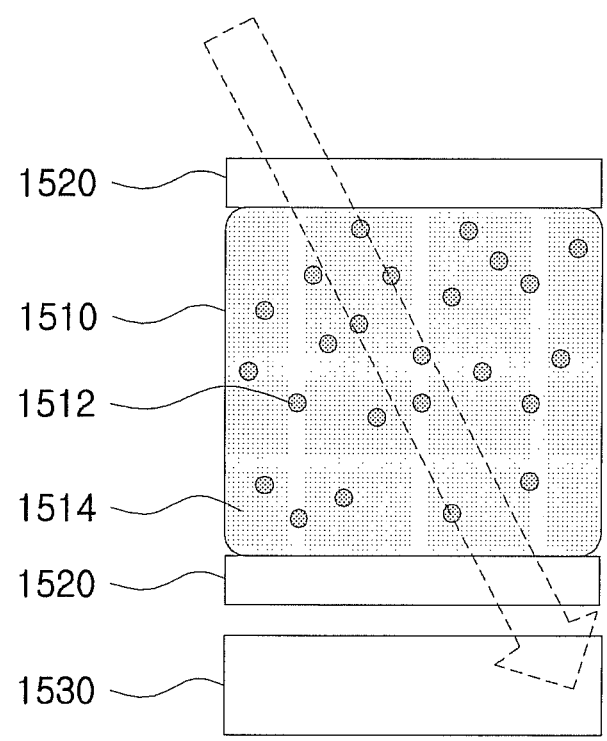
FIG. 15 is a diagram exemplarily illustrating the configuration of the display apparatus including a solar cell unit in accordance with one embodiment of the present invention.

FIG. 15 is a diagram exemplarily illustrating the configuration of the display apparatus including a solar cell unit in accordance with one embodiment of the present invention.

Referring to FIG. 15, a display apparatus 1500 in accordance with one embodiment of the present invention may further include a solar cell unit 1530 that performs the function of generating an electromotive force by using light transmitted through the display apparatus 1500 and storing the generated electromotive force. The electromotive force generated by the solar cell unit 1530 can be used to generate a voltage, which is applied to the electrode 1520, whereby the display apparatus 1500 can realize the above-described photonic crystal display without depending on an external power supply. However, a combination of the display apparatus and the solar cell unit in accordance with the present invention is not necessarily limited to those listed above, but the electromotive force generated by the solar cell unit may be used for purposes other than driving the display apparatus.

Meanwhile, the display apparatus using the photonic crystal characteristic is operated by a principle selectively reflecting the light having the specific wavelength in the incident light, and thus, it may also be easy to represent complete black/white by using the display apparatus using the photonic crystal characteristic. Hereinafter, a configuration of displaying black or white by using the display apparatus having the photonic crystal characteristic will be described.

Figure 16:
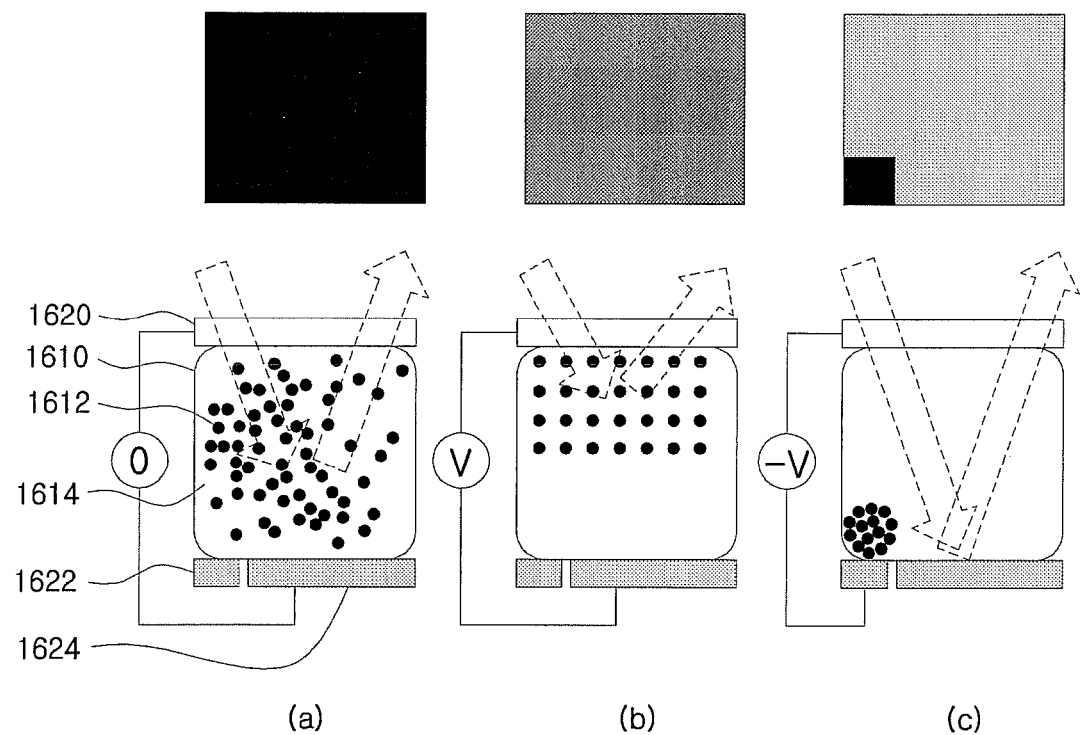
FIG. 16 is a diagram exemplarily illustrating a configuration of the display apparatus displaying black or white in accordance with one embodiment of the present invention.

FIG. 16 is a diagram exemplarily illustrating a configuration of the display apparatus displaying black or white in accordance with one embodiment of the present invention.

Referring to FIG. 16, a display unit 1610 may include black particles 1612 and the electrode may be configured to include a transparent upper electrode 1620 and white first and second lower electrodes 1622 and 1624. First, when the intensity of the electric field applied to the display unit 1610 is below a predetermined value or the electric field is not applied, the particles 1612 does not represent the photonic crystal and may reflect its own unique color, i.e., black, or reflect scattered light due to the difference in refractive indices of the particles and the solvent, and thus, the display unit 1610 may display a black color (see FIG. 16(a)). Although not shown in FIG. 16, black particles 1612 may be arranged to be close to the upper electrode 1620 by applying the electric field of a threshold value or more to the display unit 1610. Even in this case, the display unit 1610 may display a black color. Next, when the electric field of appropriate intensity is applied to the display unit 1610, the light having any desired wavelength range may be reflected from the particles 1612 that implement the photonic crystal (see FIG. 16(b)). Next, when the electric field of the preset intensity or more is applied to the display unit 1610, as the magnitude in electrical attraction inducing the electrophoresis is excessively large, the distances of particles 1612 are not appropriately maintained and the particles 1612 may be concentrated to one side. For example, when the electric field of the preset value or more is applied to only the portion of the first lower electrode 1622, all the particles 1612 included in the display unit 1610 do not implement the photonic crystal, and thus, may be concentrated to a narrow region covered by the first lower electrode 1622. Therefore, the second lower electrode 1624 may reflect its own unique color, i.e., white, without being affected by the black particles 1612, and thus, the display unit 1610 may display white (see FIG. 16(c)).

However, in the embodiment of FIG. 16, the colors of the particles and the electrode are specified black and white, but are not limited thereto. The colors of the particles and the electrode that may be applied to the display apparatus of the present invention may be arbitrarily changed and may be set transparently. Hereinafter, a configuration of a transparent display by using the display apparatus having the photonic crystal characteristic will be described.

Figure 17:
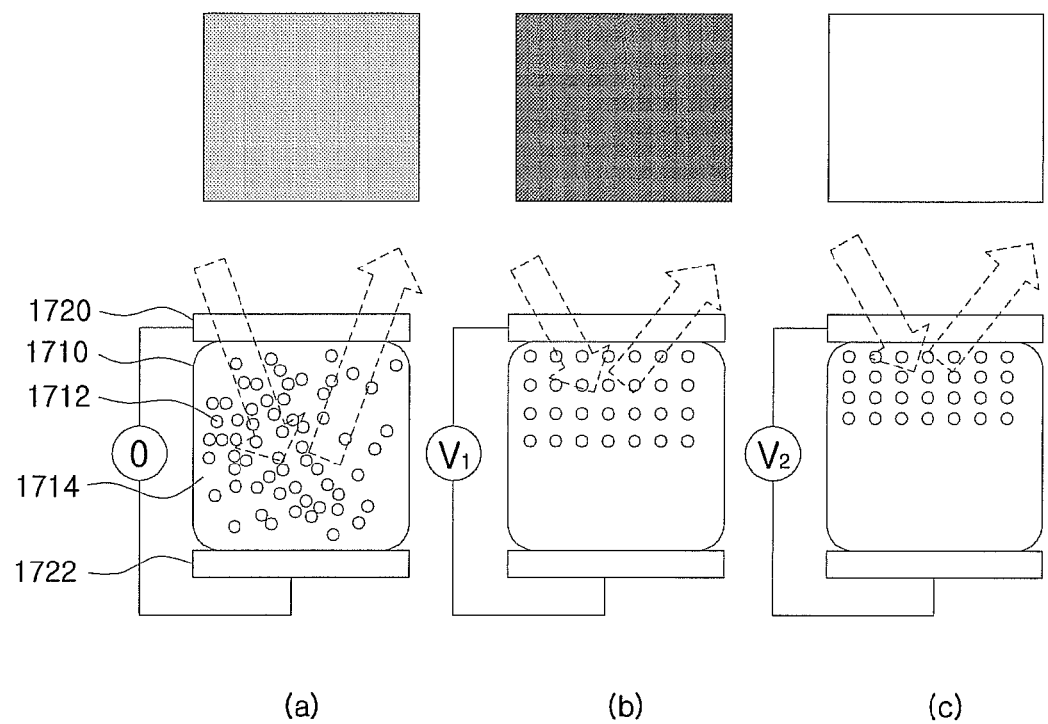
FIG. 17 is a diagram exemplarily illustrating a configuration of the display apparatus implementing a transparent display apparatus in accordance with one embodiment of the present invention.

FIG. 17 is a diagram exemplarily illustrating a configuration of the display apparatus implementing a transparent display apparatus in accordance with one embodiment of the present invention.

Referring to FIG. 17, a display unit 1710 may include transparent particles 1712 including a material, which transmits visible rays, such as $SiO_x$ or the like, and the electrode may be configured to include an upper electrode 1720 and a lower electrode 1722. First, when the intensity of electric field applied to the display unit 1710 is below the preset value or the electric field is not applied, the particles 1712 do not implement the photonic crystal and do not show the color due to the photonic crystal and may scatter the incident light due to the difference in refractive indices between the particles and the solvent (see FIG. 17(a)). Next, when the electric field of appropriate intensity is applied to the display unit 1710, the light having any desired wavelength range may be reflected from the particles 1712 that implement the photonic crystal (see FIG. 17(b)). Next, when the electric field of the predetermined intensity or more is applied to the display unit 1710, as the magnitude in the electrical attraction inducing the electrophoresis is excessively large, the distances of particles 1712 may reflect only light having a wavelength range (for example, an ultraviolet band) shorter than the visible rays That is, in this case, since the light of the visible ray band is transmitted without being reflected by the photonic crystals, all the upper electrode 1720, the lower electrode 1722 and the particles 1712 are transparent, and thus, the display apparatus of FIG. 17 may be transparent (see FIG. 17(c)).

Meanwhile, although not specifically shown in FIG. 17, in the case of FIG. 17(c), light in the visible ray band is not reflected by the photonic crystals but is transmitted. Therefore, when the electrode having the specific color as the lower electrode is used, the color of the lower electrode may be continuously displayed.

That is, the display apparatus in accordance with the exemplary embodiment of the present invention is translucent or opaque due to the scattering of incident light when voltage of a specific level or less is applied; displays a predetermined color by reflecting the incident light in a visible ray band by a regular arrangement (that is, photonic crystal) of particles when the voltage in the specific range is applied; and is transparent by transmitting the incident light in the visible ray band and reflecting the incident light in the ultraviolet band that is a shorter wavelength range than the visible ray band, due to the excessively narrow inter-particle distances when the voltage exceeding the specific level is applied. Therefore, in accordance with the display apparatus of the exemplary embodiments of the present invention, it becomes possible to manufacture a variable color glass or the like, that may reflect the light in any wavelength range and may become transparent or opaque. Further, it becomes possible to implement a display system that can make a specific color or pattern present at one side based on a display apparatus to be visible or invisible to an observer who is present at the other side by controlling the transparency of the display apparatus.

Figure 18:
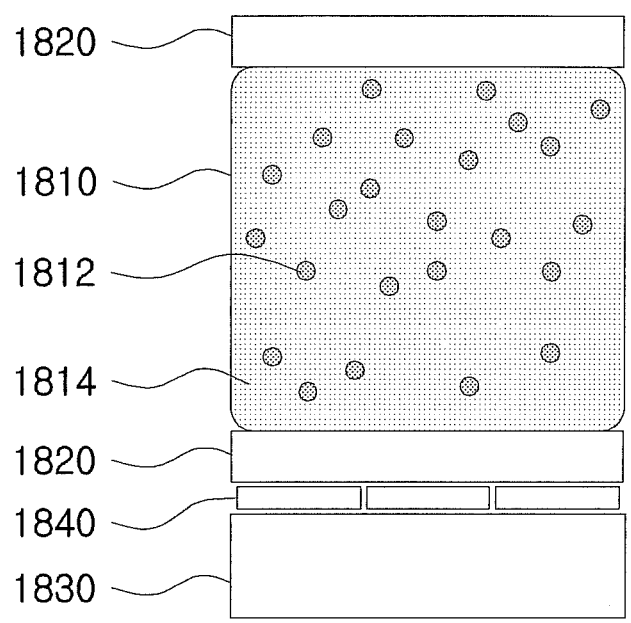
FIG. 18 is a diagram exemplarily illustrating a configuration of a combination of a reflective display apparatus and an emissive display apparatus in accordance with one embodiment of the present invention.

FIG. 18 is a diagram exemplarily illustrating a configuration of a combination of a reflective display apparatus and an emissive display apparatus in accordance with one embodiment of the present invention.

In addition, the separate emissive display apparatus 1830 and 1840 may be combined with the reflective display apparatus 1810 and 1820 in accordance with the present invention. In more detail, the reflected light is displayed by the photonic crystals at the mode in which the reflective display apparatus 1810 and 1820 are operated by combining the emissive display apparatus 1830 and 1840 with the reflective display apparatus 1810 and 1820 in accordance with one embodiment of the present invention and driving the reflective display apparatus 1810 and 1820 and the reflective display apparatus 1830 and 1840, independently from each other. On the other hand, at the mode in which the emissive display apparatus 1830 and 1840 are operated, the light, which is generated at the predetermined back light and transmits the color filter, may transmit the photonic crystal particles and may be displayed. As described above, when the reflective display apparatus is combined with the emissive display apparatus, the power consumption can be reduced as compared with the case of using only the emissive display apparatus, and the range of the displayable colors can be expanded as compared with the case of using only the reflective display apparatus.

[Light Transmittance Control]

Figure 19:
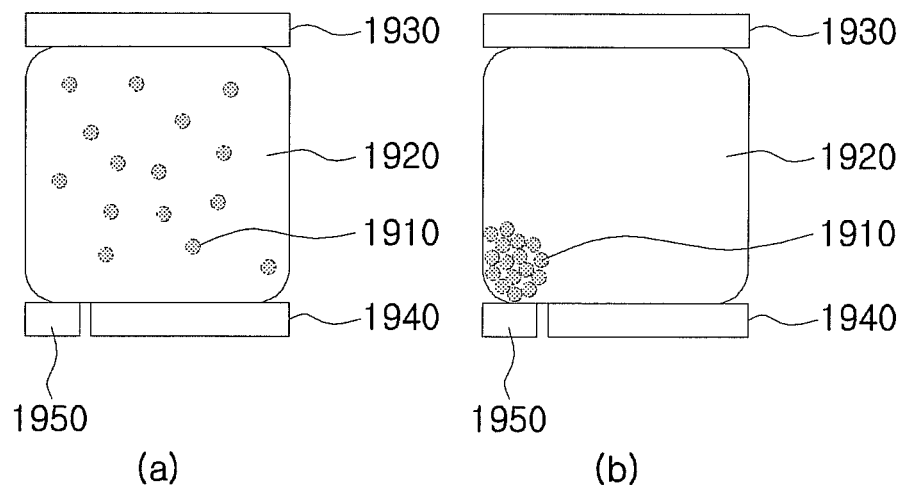
FIGS. 19 and 20 are diagrams exemplarily illustrating a configuration of tuning the transmittance of light in accordance with one embodiment of the present invention.
Figure 20:
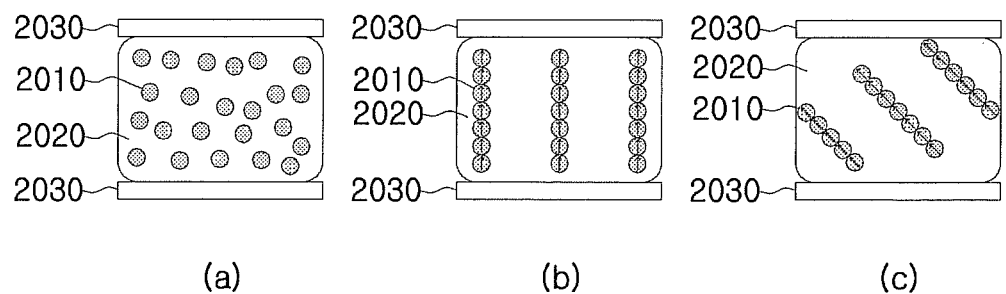

FIGS. 19 and 20 are diagrams exemplarily illustrating a configuration of tuning the transmittance of light in accordance with one embodiment of the present invention. For reference, upper electrodes 1930 and 2030 and lower electrodes 1940, 1950 and 2040 of display apparatus 1900 and 2000 in accordance with another embodiment of the present invention may be made of a light transmissive material.

Meanwhile, in accordance with another embodiment of the present invention, the transmittance of light incident to the particles and the solvent may be controlled through the control of the position or the arrangement of the particles, by applying electric field through the electrode in the state in which the plurality of particles are dispersed in the solvent and controlling at least one of the intensity and direction of the electric field.

First, in accordance another embodiment of the present invention, when the electric field is not applied, the particles in the solvent may be irregularly dispersed. In this case, the transmittance of light incident to the particles and the solvent is in a state that is not particularly controlled. That is, a part of light incident to the particles and the solvent is scattered and reflected by the plurality of particles that are irregularly dispersed and the remaining thereof may transmit through the particles or the solvent as it is Next, in accordance with another embodiment of the present invention, when a plurality of particles having electric charges of the same sign are dispersed in a solvent, if an electric field is applied to the particles and the solvent, the electrical attraction proportional to the intensity of the electric field and the charge amount of the particles acts on the particles due to the electric charges of the particles. Therefore, the plurality of particles moves in a predetermined direction by electrophoresis. In this case, when the applied intensity of electric field is the predetermined value or more, the plurality of particles does not form the photonic crystals as in the first mode and the inter-particle distances are narrow, and thus, move to the electrode to which the electric field is applied while the particles are aggregated.

Referring to FIG. 19, when the electric field is not applied, since a plurality of particles 1910 are irregularly arranged in the solvent, the incident light is scattered or reflected by the particles 1910, and thus, the transmittance of incident light is in the low state without being tuned (see FIG. 19(*a*)). However, when the particles 1910 are concentrated to the second lower electrode 1950 by applying the predetermined voltage to the second lower electrode 1950 having a relatively narrow area, the light incident through the first lower electrode 1940 having the relatively wide area is not scattered or reflected by the particles 1910, and thus, the transmittance of light incident to the display apparatus 1900 may be generally increased (see FIG. 19(*b*)). The transmittance of light incident to the display apparatus 1900 may be tuned by controlling the area of the second lower electrode 1950 or the intensity of voltage applied to the second lower electrode 1950 using the above-mentioned principle.

Next, in accordance with another embodiment of the present invention, when the electric field is applied to the particles and the solvent in the state in which the plurality of particles having the electrical polarization characteristic are dispersed in the solvent, the plurality of particles are polarized by the electric field, and thus, may be polarized in the same direction along the direction of the electric field. Since the electrical attraction is generated between the plurality of particles polarized in the same direction, the plurality of particles dispersed in the solvent are attracted to each other, and thus, may be regularly arranged in a direction parallel with the direction of the electric field. Therefore, the transmittance of light incident to the solvent and the particles can be tuned by controlling the arrangement state of the plurality of particles regularly arranged in a direction parallel with the direction of the electric field, by controlling the intensity or direction of the electric field.

Referring to FIG. 20, when the electric field is not applied, since a plurality of particles 2010 are irregularly arranged, incident light 2040 is scattered or reflected by particles 2010 and a solvent 2020 or transmits the solvent 2020 as it is, such that the transmittance of incident light 2040 is not tuned and is in a low state (see FIG. 20(*a*)). Referring to FIG. 20, when the electric field is applied in to the state in which the plurality of particles 2010 is dispersed in the solvent 2020, since the plurality of particles 2010 are arranged in a direction parallel with a direction of the incident light 2040, as the angle of the direction of the incident light 2040 and the arrangement direction of the particles 2010 is small, that is, the direction in which the incident light 2040 is incident is close to be parallel with the arrangement direction of the particles 2010, the degree in which the incident light 2040 is reflected or scattered by the particles 2010 is relatively low, such that the transmittance of incident light 2040 may be relatively increased (see FIG. 20(*b*)). On the other hand, when the arrangement direction of the particles 2010 forms a predetermined angle without being parallel with the direction of the incident light 2040, the degree in which the incident light 2040 is reflected or scattered by the particles 2010 is relatively increased, such that the transmittance of incident light 2040 may be low (see FIG. 20(*c*)).

[Application of Display Apparatus]

Meanwhile, in accordance with one embodiment of the present invention, a color is displayed on an object region corresponding to any one of at least one sample color displayed on a sample region that is selected by the user, or a color corresponding to the sensing information acquired from various sensing units is displayed on the object region, such that the user interface for the user to intuitively control the color displayed on the object region may be provided and various sensing information may be visually displayed.

Similarly, in accordance with another embodiment of the present invention, a transmittance of light is implemented on the object region corresponding to any one of the transmittance of sample light of at least one level implemented on the sample region that is selected by the user, or a transmittance of light corresponding to the sensing information acquired from various sensing units is displayed on the object region, such that the user interface for the user to intuitively control the transmittance of light displayed on the object region may be provided and various sensing information may be visually displayed.

Figure 21:
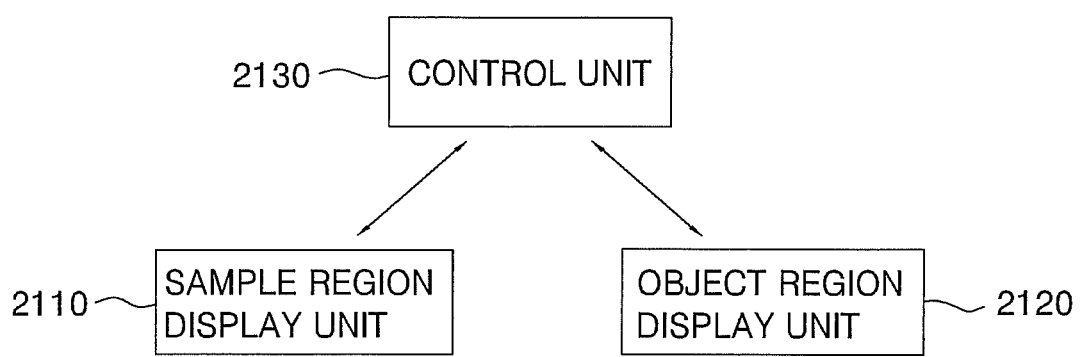
FIG. 21 is a diagram exemplarily illustrating a configuration of the display apparatus displaying on an object region a sample color selected by a user in accordance with one embodiment of the present invention.

FIG. 21 is a diagram exemplarily illustrating a configuration of the display apparatus displaying a sample color selected by a user on an object region in accordance with one embodiment of the present invention.

Referring to FIG. 21, a display apparatus 2100 in accordance with one embodiment of the present invention may include a sample region display unit 2110, an object region display unit 2120 and a control unit 2130.

First, in accordance with one embodiment of the present invention, the sample region display unit 2110 may provide the user interface that performs a function of displaying at least one sample color on the predetermined sample region or implementing the transmittance of sample light of at least one level, so as for the user to select his/her desired color of at least one sample color displayed on the sample region or his/her desired transmittance of light of the transmittance of sample light of at least one level implemented on the sample region. In addition, in accordance with one embodiment of the present invention, the sample region display unit 2110 may perform a function of generating the input signal with respect to the color or the transmittance of light selected by the user and transferring the generated input signal to the control unit 2130 to be described later.

In more detail, the sample region display unit 2110 according to one embodiment of the present invention applies the electric field to the plurality of particles and the solvent and controls at least one of the intensity and the direction of the electric field so as to control the inter-particle distances, thereby variably displaying the color of light reflected from the particles. As a result, at least one sample color may be displayed on the sample region. Further, in accordance with one embodiment of the present invention, the sample region display unit 2110 may control the position or the arrangement of particles by applying the electric field to the plurality of particles and the solvent and controlling at least one of the intensity and the direction of electric field so as to control the location or the arrangement of the particle, thereby controlling the transmittance of light incident to the particles and the solvent.

Meanwhile, in accordance with one embodiment of the present invention, at least one sample color displayed on the sample region so as to be adjacent to each other may each have a continuous wavelength range, such that the user may more accurately select his/her desired color. In addition, in accordance with one embodiment of the present invention, a touch pad may be implemented on the sample region in which the sample color is displayed, such that the user may more intuitively and naturally select the sample color. However, it is to be noted that the sample color displaying method or the sample color selecting method in accordance with the embodiment of the present invention is not necessarily limited to the listed embodiments, but may be changed without departing from the scope of the present invention.

Next, in accordance with one embodiment of the present invention, the object region display unit 2120 may perform a function of displaying a color corresponding to the color selected by the user on the predetermined object region or implementing a transmittance of light corresponding to the transmittance of light selected by the user, with reference to the control signal transferred from the control unit 2130 to be described below.

In more detail, the object region display unit 2120 according to one embodiment of the present invention applies the electric field to the plurality of particles and the solvent and controls at least one of the intensity and the direction of the electric field to control the inter-particle distances, thereby variably displaying the color of light reflected from the particles. As a result, at least one sample color may be displayed on the object region. Therefore, a color having the continuous wavelength range, which may be changed (that is, changed into the analog form) according to the inter-particle distances rather than colors represented as the mixing color of several colors, may be displayed on the object region. However, it is to be noted that the display unit to which the object region display unit in accordance with the embodiment of the present invention may be applied to is not necessarily limited to the listed embodiments, but may be changed without departing from the scope of the present invention. For example, the object region display unit in accordance with another embodiment of the present invention may include a mixture of a dye of which the color is changed according to temperature, a dye of which the color is changed according to pressure, or the like. Further, in accordance with one embodiment of the present invention, the object region display unit 2120 may control the position or the arrangement of particles by applying the electric field to the plurality of particles and the solvent and controlling at least one of the intensity and the direction of electric field so as to control the location or the arrangement of the particle, thereby controlling the transmittance of light incident to the particles and the solvent.

Next, in accordance with one embodiment of the present invention, the control unit 2130 may acquire the input signal about the selection of any one of at least any one sample color displayed on the sample region, or input signal about the selection of any one of the transmittance of sample light of at least one level from the sample region display unit 2110, and then, may generate the control signal with respect to one displaying a color corresponding to the color to be displayed on the object region, that is, the selected color, or the control signal with respect to one implementing a transmittance of light corresponding to the selected transmittance of light. The control signal generated as described above may be transferred to the object region display unit 2120. According to one embodiment of the present invention, the control unit 2130 may be included in the display apparatus in a type of an operating system, application program modules and other program modules, and may physically be stored in several known storage apparatus. In addition, the program module may also be stored in a remote storage apparatus communicable with the display apparatus 2100. Meanwhile, the program module includes a routine, a subroutine, a program, an object, a component, a data structure, etc., which executes specific businesses described below in accordance with the embodiment of the present invention or executes a specific abstraction data type, but is not limited thereto.

Figure 22:
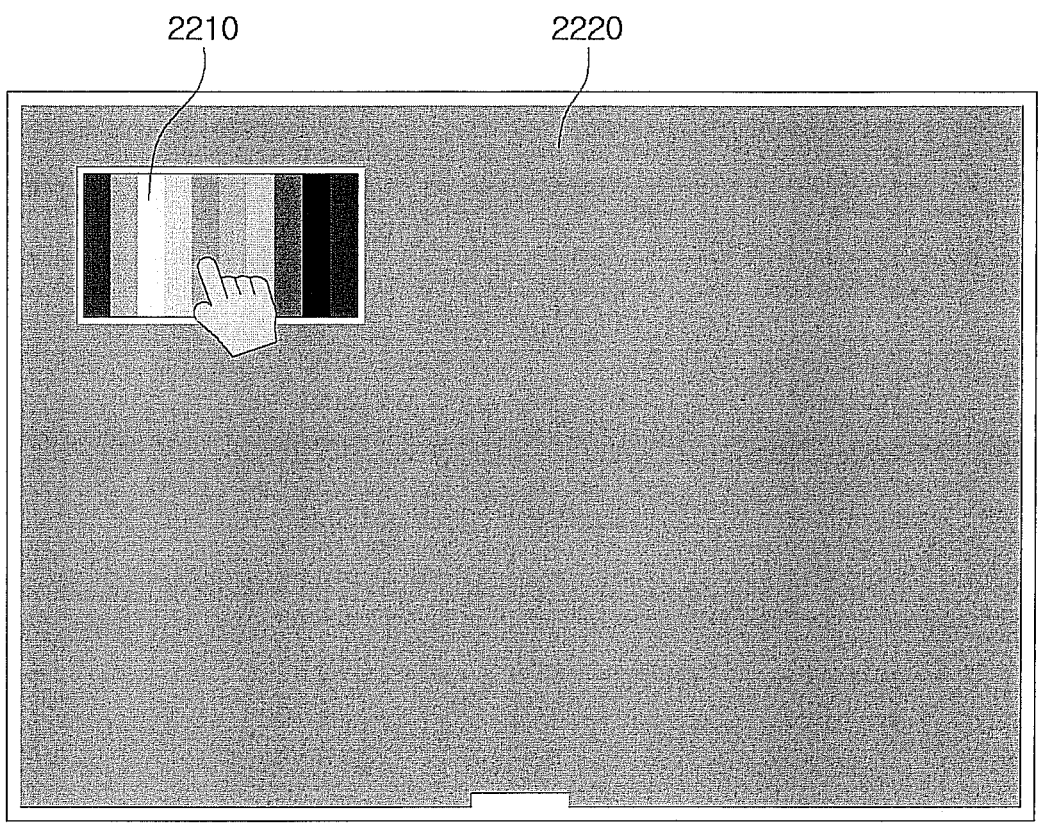
FIGS. 22 and 23 are diagrams exemplarily illustrating a configuration of an application apparatus including the display apparatus in accordance with one embodiment of the present invention.
Figure 23:
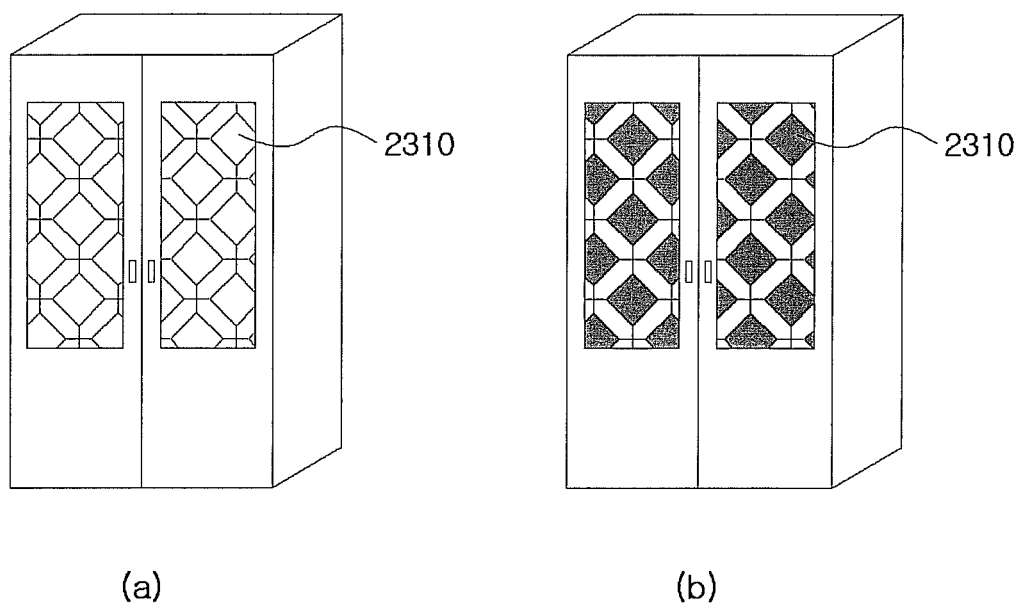

FIGS. 22 and 23 are views exemplarily illustrating a configuration of an application apparatus including the display apparatus in accordance with one embodiment of the present invention.

Referring to FIG. 22, a color of an appearance of a notebook may be controlled using the display apparatus according to one embodiment of the present invention. According to one embodiment of the present invention, at least one sample color having the continuous wavelength range may be displayed on the sample region 2210 that is positioned on one side of the appearance of the notebook, and if the user selects green of the sample color displayed on the sample region 2210, then a green color may be displayed on the object region 2220, that is, on the overall appearance of the notebook. Meanwhile, in accordance with one embodiment of the present invention, the transmittance of light corresponding to the transmittance of light selected by the user is implemented on the object region of the notebook, thereby variably controlling the transmittance of the appearance of the notebook.

In addition, referring to FIG. 23, a color of an appearance of furniture may be controlled using the display apparatus according to one embodiment of the present invention. In accordance with one embodiment of the present invention, the object region 2310 implemented in a film type may cover at least a part of the appearance of furniture, and it becomes possible to variably control a color of furniture by displaying a color corresponding to a color selected by the user among at least one sample color displayed in the sample region (not shown) on the object region 2310. As shown in FIG. 23, an aesthetic sensor of furniture may be improved by variably displaying the color of main ornament portion of furniture (for example, pearl ornament or the like). Meanwhile, in accordance with one embodiment of the present invention, the transmittance of light corresponding to the transmittance of light selected by the user is implemented on the object region of furniture, thereby variably controlling the transmittance of the main ornament of furniture. In addition, although not shown in the drawings, in the home refrigerator used in the home, the color of the surface of the frame may be changed so as to be harmonized with the user desire or the surrounding environment.

However, it is to be noted that application fields to which the display apparatus according to one embodiment of the present invention may be applied is not necessarily limited to the listed contents, and may be applied to various fields such as a bag, clothes, a pot or the like, in addition to construction materials such as a wall, a ceil, a floor, an outer wall and glass.

Figure 24:
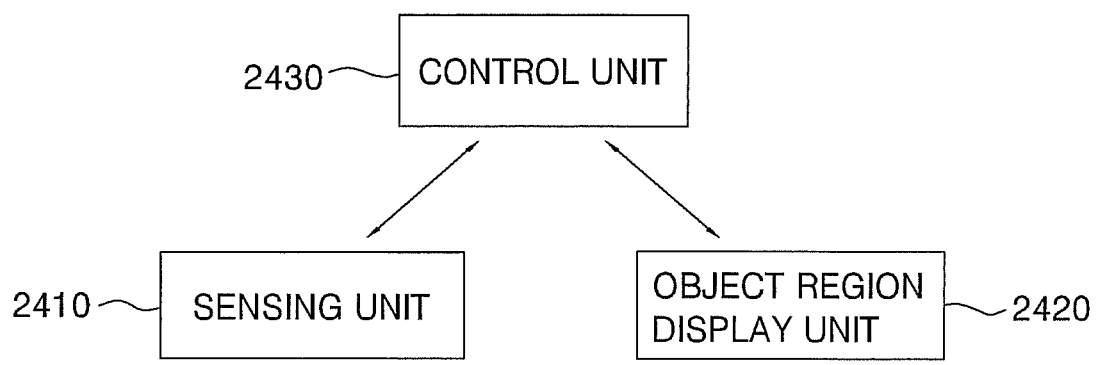
FIG. 24 is a diagram exemplarily illustrating a configuration of the display apparatus displaying on the object region the color corresponding to the sensing information acquired from various sensing units in accordance with one embodiment of the present invention.

FIG. 24 is a diagram exemplarily illustrating a configuration of the display apparatus displaying the color corresponding to the sensing information acquired from various sensing units on the object region, in accordance with one embodiment of the present invention.

Referring to FIG. 24, a display apparatus 2400 in accordance with one embodiment of the present invention may include a sensing unit 2410, an object region display unit 2420 and a control unit 2430.

First, in accordance with one embodiment of the present invention, the sensing unit 2410 may perform a function of acquiring various sensing information using at least sensing unit. In addition, in accordance with one embodiment of the present invention, the sensing unit 2410 may perform a function of generating the input signal with respect to the sensing information acquired by the sensing unit and transferring the generated input signal to the control unit 2430 to be described later. In more detail, an example of the sensing unit that may be included in the sensing unit 2410 according to one embodiment of the present invention may include a gyro sensor, a temperature sensor, a humidity sensor, a pressure sensor, an acoustic sensor, a photo sensor, a current sensor, a voltage sensor, an electric charge sensor, an acidity sensor, a photo sensor, an image sensor, an acoustic sensor, a body signal sensor, a timer or the like, such that various sensing information on various states of an object to be sensed can be acquired. However, it is to be noted that the sensing unit that may be included in the sensing unit 2410 in accordance with one embodiment of the present invention is not necessarily limited to the listed embodiments, but may be changed without departing from the scope of the present invention. That is, the sensing information may be information regarding the surrounding environment of the corresponding apparatus, or information that is inputted or processed by the user of the corresponding apparatus.

Next, in accordance with one embodiment of the present invention, the object region display unit 2420 may perform a function of displaying the color corresponding to the sensing information acquired from the sensing unit 2410 on the predetermined object region, or implementing the transmittance of light with reference to the control signal transferred from the control unit 2430 to be described below. In more detail, the object region display unit 2420 according to one embodiment of the present invention applies the electric field to the plurality of particles and the solvent and controls at least one of the intensity and the direction of the electric field to control the inter-particle distances, thereby variably displaying the color of light reflected from the particles. As a result, at least one sample color may be displayed on the object region. Therefore, a color having the continuous wavelength range, which may be changed (that is, changed into the analog form) according to the inter-particle distances rather than colors represented as the mixing color of several colors, may be displayed on the object region. However, it is to be noted that the display unit to which the object region display unit in accordance with one embodiment of the present invention may be applied to is not necessarily limited to the listed embodiments, but may be changed without departing from the scope of the present invention. For example, the object region display unit in accordance with another embodiment of the present invention may include a mixture of a dye of which the color is changed according to temperature, a dye of which the color is changed according to pressure, or the like. Further, in accordance with one embodiment of the present invention, the object region display unit 2420 may control the position or the arrangement of particles by applying the electric field to the plurality of particles and the solvent and controlling at least one of the intensity and the direction of electric field to control the location or the arrangement of the particle, thereby controlling the transmittance of light incident to the particles and the solvent.

Next, in accordance with one embodiment of the present invention, the control unit 2430 may acquire the input signal on the sensing information obtained as the result of sensing the state of the object to be sensed from the sensing unit 2410 and generate the control signal for the color to be displayed on the object region or the transmittance of light implemented on the object region with reference to the acquired input signal. Therefore, the control signal generated as described above may be transferred to the object region display unit 2420. According to one embodiment of the present invention, the control unit 2430 may be included in the display apparatus 2400 in a type of an operating system, application program modules and other program modules, and may physically be stored in several known storage apparatus. In addition, the program module may also be stored in a remote storage apparatus communicable with the display apparatus 2400. Meanwhile, the program module includes a routine, a subroutine, a program, an object, a component, a data structure, etc. which executes specific businesses described below in accordance with one embodiment of the present invention or executes a specific abstraction data type, but is not limited thereto.

For example, the display apparatus in accordance with one embodiment of the present invention may acquire the sensing information on freshness of food, that is, corruption of food by sensing the acidity of food stored in a refrigerator using the acidity sensor, and display the predetermined color meaning the freshness of food in the predetermined region of the appearance of the refrigerator by referring to the acquired sensing information. In more detail, the display apparatus may display green when the freshness of food is high, yellow when the freshness of food is intermediate, and red when the freshness of food is low. Further, a configuration of changing the color of the surface may be considered according to the temperature of the refrigerator by measuring the temperature of the refrigerator.

As described above, since the display apparatus in accordance with one embodiment of the present invention may be manufactured in a flexible film type having a thin thickness and may be implemented by a full color display, the display apparatus may be easily applied to the surface having the curved appearance of various objects such as electronic apparatus (e.g., a mobile phone, a notebook, a PC, a TV, a personal multimedia player (PMP), a refrigerator or the like), an acoustic apparatus (e.g., a speaker or the like), a body diagnostic apparatus, a watch, an electric heat apparatus, a heating and cooling apparatus, a humidity control apparatus, a car, a bicycle, furniture, clothes, construction materials (e.g., indoor wall surface, an outer wall of building, glass, an advertising panel or the like). Therefore, the color or the transparency of the appearance of various objects may be freely controlled.

FIGS. 25 to 33 are diagrams exemplarily illustrating a configuration of an application apparatus including the display apparatus in accordance with one embodiment of the present invention.

Figure 25:
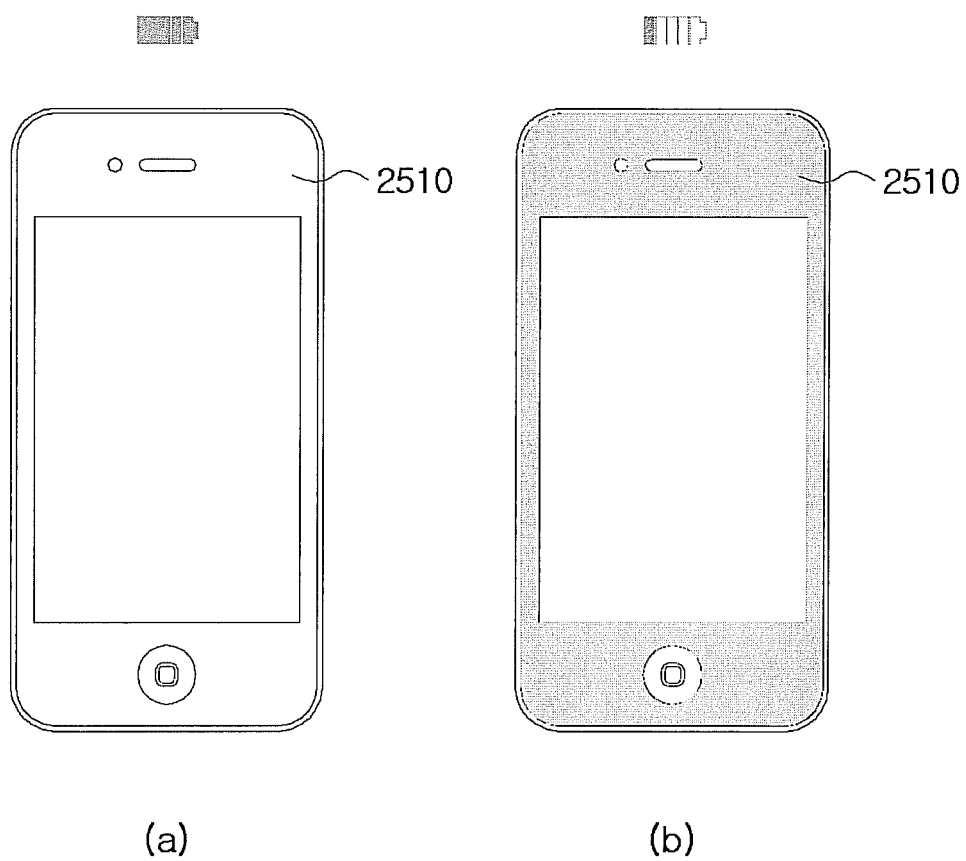
FIGS. 25 to 33 are diagrams exemplarily illustrating a configuration of an application apparatus including the display apparatus in accordance with one embodiment of the present invention.

Referring to FIG. 25, the color of the appearance of the electronic apparatus may be controlled by referring to the information on the charging state (that is, residual amount) of the battery. In more detail, in accordance with one embodiment of the present invention, the charging state of the battery of the portable charging state may be visually displayed as the color of the appearance of the portable electronic apparatus by disposing the object region 2510, which may variably display colors in at least a portion of the appearance of the portable electronic apparatus, and displaying the color corresponding to the information on the charging state of the battery of the portable electronic apparatus acquired as the result of sensing a charge amount, a current value, a voltage value or the like of the battery of the portable electronic apparatus. For example, when the residual amount of the battery is sufficient, a particular color is not displayed on the appearance 2510 of the mobile phone (see FIG. 25(*a*)), and when the residual amount of the battery is running short, a gray color is displayed on the appearance 2510 of the mobile phone to give a visual warning to the user (see FIG. 25(*b*)).

In addition, in accordance with one embodiment of the present invention, the charging state of the battery of the electronic apparatus may be visually displayed as the transparency of the appearance by implementing the transmittance of light, which corresponds to the information on the charging state of the battery of the electronic apparatus, on the object region of the appearance of the electronic apparatus.

Figure 26:
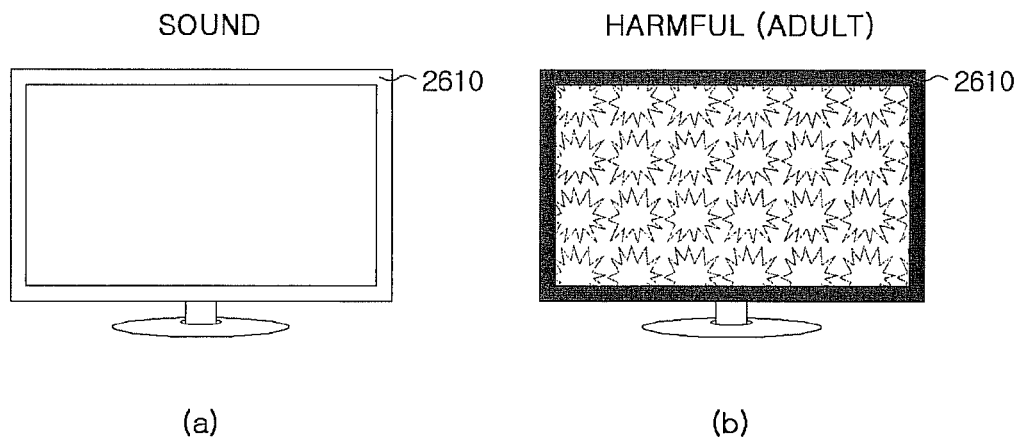

Referring to FIG. 26, the color of the appearance of the terminal apparatus such as the notebook, the PC or the like, may be controlled by referring to the information on the contents provided to the user. In more detail, in accordance with one embodiment of the present invention, the harmful effect of the contents provided on the terminal apparatus can be visually displayed as the color of the appearance of the monitor of the terminal apparatus by disposing the object region 2610, which variably displays the color in at least some region (for example, a bezel region of the monitor) of the appearance of the monitor of the terminal apparatus, and displaying a color, which corresponds to the information on whether the acquired contents is harmful as the result of recognizing the context information on whether the web site displayed on the monitor is a harmful web site, on the object region 2610. For example, when the sound contents are provided through the monitor of the terminal apparatus, a particular color is not displayed on the bezel 2610 of the monitor (see FIG. 26(*a*)), and when the harmful contents are provided, the red color may be displayed on the bezel 2610 of the monitor (see FIG. 26(*b*)). The color of the appearance of the terminal apparatus may variably be displayed according to a type of contents, content, the caller of a received call or the like, by using the same principle as the embodiment.

In addition, in accordance with one embodiment of the present invention, the information on the contents provided from the terminal apparatus may be visually represented as the transparency of the appearance, by implementing the transmittance of light, which corresponds to the information on the contents provided from the terminal apparatus, on the object region of the appearance of the terminal apparatus.

Figure 27:
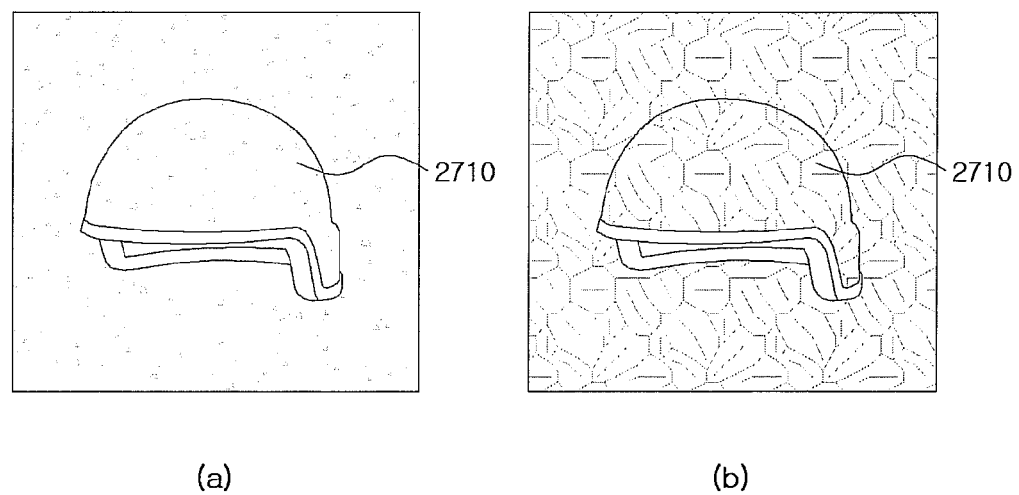

Referring to FIG. 27, the color of the appearance of a disguising apparatus, such as a helmet, a jacket, a tent or the like, may be controlled by referring to the information on the surrounding environment. In more detail, in accordance with one embodiment of the present invention, the color of the appearance of the disguising helmet may be controlled so that the color, pattern, brightness or the like of the disguising helmet becomes similar to those of the surrounding environment, by disposing the object region 2710, which variably displays color, on at least some region of the appearance of the disguising helmet, and displaying a color, which corresponds to the information on the surrounding environment acquired as the result of recognizing the color, pattern, brightness or the like of the surrounding environment of the disguising helmet, on the object region 2710. For example, when the concrete wall is present around the disguising helmet, the color and pattern similar to those of the concrete wall may be displayed on the appearance 2710 of the disguising helmet (see FIG. 27(*a*)) and when many leaves are present around the disguising helmet, the color and pattern similar to those of the leaves may be displayed on the appearance 2710 of the disguising helmet (see FIG. 27(*b*)). The color of the appearance, such as a disguising jacket, a disguising tent or the like, may also be controlled by using the same principle as the embodiments.

In addition, in accordance with one embodiment of the present invention, the transmittance of light of the appearance of the disguising helmet may be tuned so that the transparency of the disguising helmet becomes similar to that of the surrounding environment, by implementing a transmittance of light, which corresponds to the information on the surrounding environment, on the object region.

Figure 28:
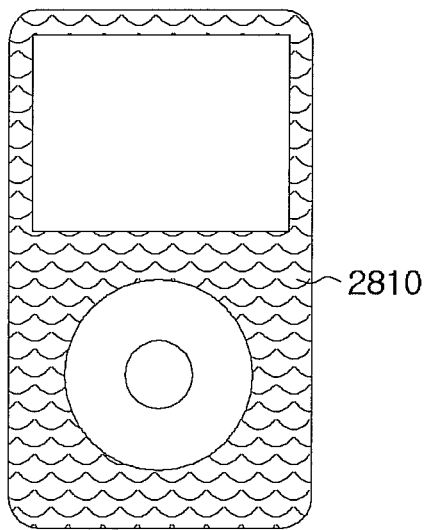
Figure 28:
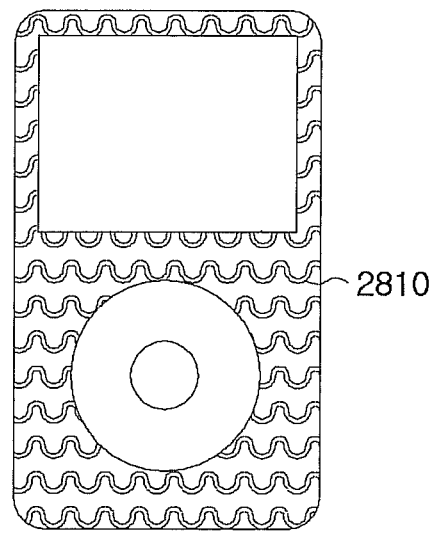

Referring to FIG. 28, the color of the appearance of the acoustic apparatus may be controlled by referring to the information on the output sound. In more detail, in accordance with one embodiment of the present invention, the information on the sound outputted from the acoustic apparatus may be visually displayed as the color of the appearance of the acoustic apparatus, by disposing the object region 2810, which variably displays the color in at least some region of the acoustic apparatus, and displaying a color, which corresponds to the information on the sound acquired as the result of recognizing the intensity, frequency, rhythm, tune, beat, genre or the like of the output sound, on the object region 2810. For example, when the genre of sound output from the acoustic apparatus is classic and dance, different colors and patterns may be displayed on the appearance 2810 of the acoustic apparatus (see FIGS. 28(*a*) and 28(*b*)).

Further, in accordance with one embodiment of the present invention, the information on the sound outputted from the acoustic apparatus may be visually displayed as the transparency of the appearance of the acoustic apparatus, by implementing the transmittance of light, which corresponds to the information on the sound, on the object region.

Figure 29:
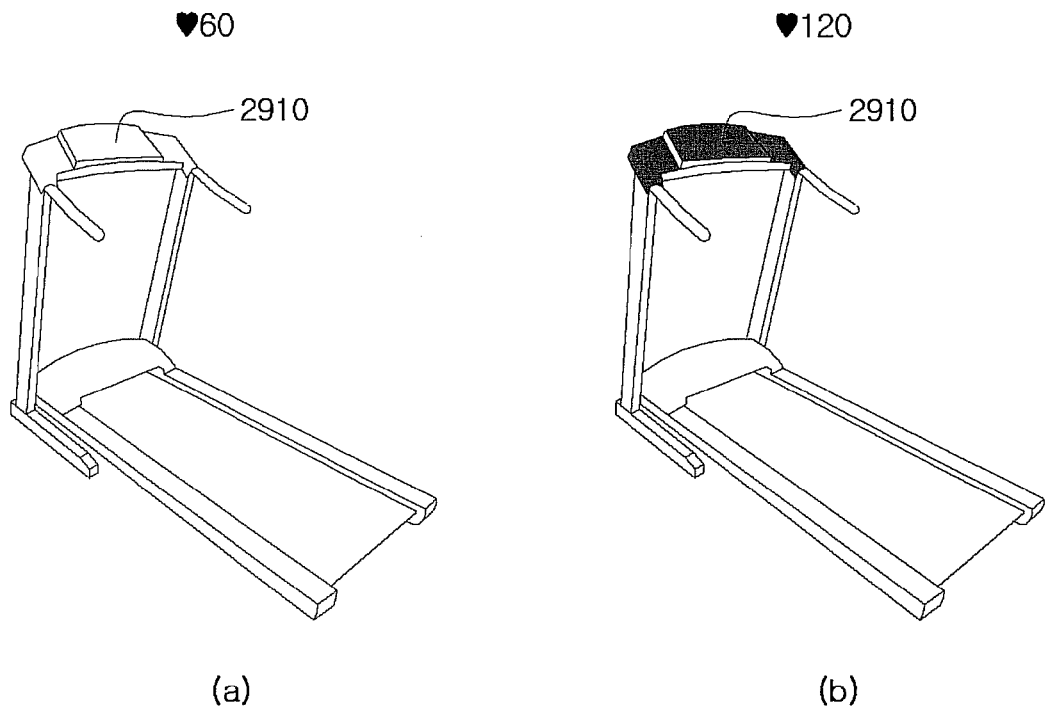

Referring to FIG. 29, the color of the appearance of an exercise apparatus or a body diagnosis apparatus may be controlled by referring to the information on the body state. More specifically, in accordance with one embodiment of the present invention, the information on the body state may be visually displayed as the color of the appearance of the exercise apparatus or the body diagnosis apparatus, by disposing the object region 2910, which is capable of variably displaying colors, in at least some region of the appearance of the exercise apparatus or the body diagnosis apparatus, and displaying a color, which corresponds to the information on the body state acquired as the result of sensing a heart rate, a blood pressure, a body temperature, a brain wave or the like of the user using the exercise apparatus or the body diagnosis apparatus, on the object region 2190. For example, when the heart rate of the user using a running machine is only 60 times, a particular color is not displayed on the appearance 2910 of the running machine (see FIG. 29(*a*)) and when the heart rate of the user corresponds to 120 times, a red color may be displayed on the appearance of the running machine (see FIG. 29(*b*)).

Further, in accordance with one embodiment of the present invention, the information on the body state may be visually displayed as the transparency of the appearance of the exercise apparatus or the body diagnosis apparatus, by implementing a transmittance of light, which corresponds to the information on the body state, on the object region.

Figure 30:
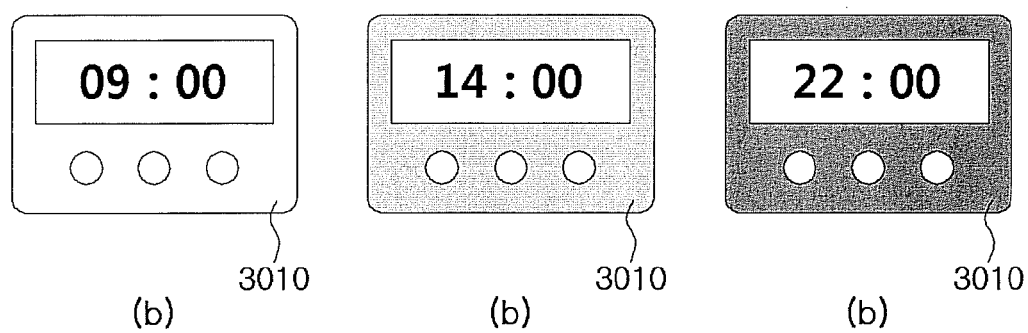

Referring to FIG. 30, a color of an appearance of a watch or a timer may be controlled by referring to information on time or hour. In more detail, in accordance with one embodiment of the present invention, the information on time may be visually displayed as the color of the appearance of the watch or the timer by disposing an object region 3010, which is capable of variably displaying colors, in at least some region of the appearance of the timer or the timer, and displaying the color, which corresponds to the information on time, on the object region 3010. For example, the color of the appearance 3010 of each watch may be differently displayed in a morning time zone, an afternoon time zone and an evening time zone (see FIGS. 30(*a*), 30(*b*) and 30(*c*)).

Further, in accordance with one embodiment of the present invention, the information on the time may be visually displayed as the transparency of the appearance of the watch or the timer, by implementing a transmittance of light, which corresponds to the information on the time, on the object region.

Figure 31:
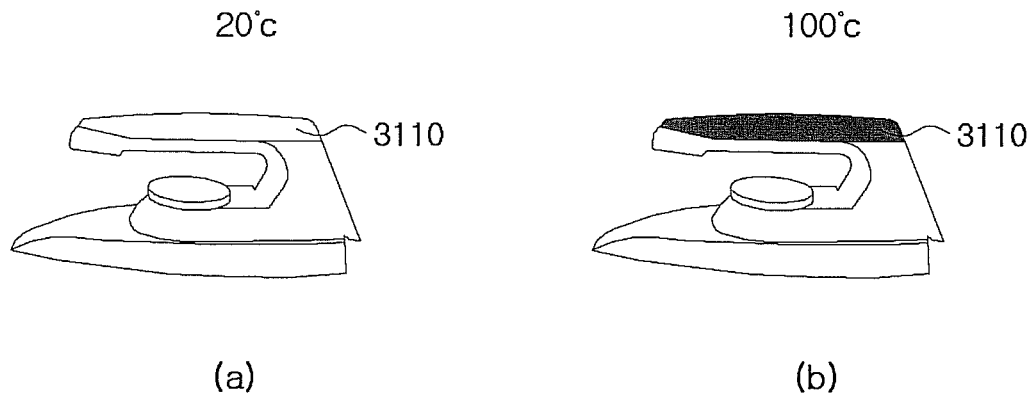

Referring to FIG. 31, the color of the appearance of the electric heat apparatus or the cooling and heating apparatus may be controlled by referring to the information on temperature. In more detail, in accordance with one embodiment of the present invention, the information on the temperature may be visually displayed as the color of the appearance of the electric heat apparatus or the heating and cooling apparatus, by disposing an object region 3110, which is capable of variably displaying colors, in at least some region of the electric heat apparatus or the cooling and heating apparatus, and displaying a color, which corresponds to the information on sensed temperature, on the object region 3110. For example, when temperature of a plate of an iron is only 20° C., a particular color is not displayed on a handle 3110 of the iron (see FIG. 31(a)), and when the temperature of the plate of the iron is very hot as 100° C., a red color is displayed on the handle 3110 of the iron, and thus, a visual warning may be given to the user (see FIG. 31(b)).

Further, in accordance with one embodiment of the present invention, the information on the temperature may be visually displayed as the transparency of the appearance of the electric heat apparatus or the cooling and heating apparatus, by displaying a transmittance of light, which corresponds to the information on the sensed temperature, on the object region.

Figure 32:
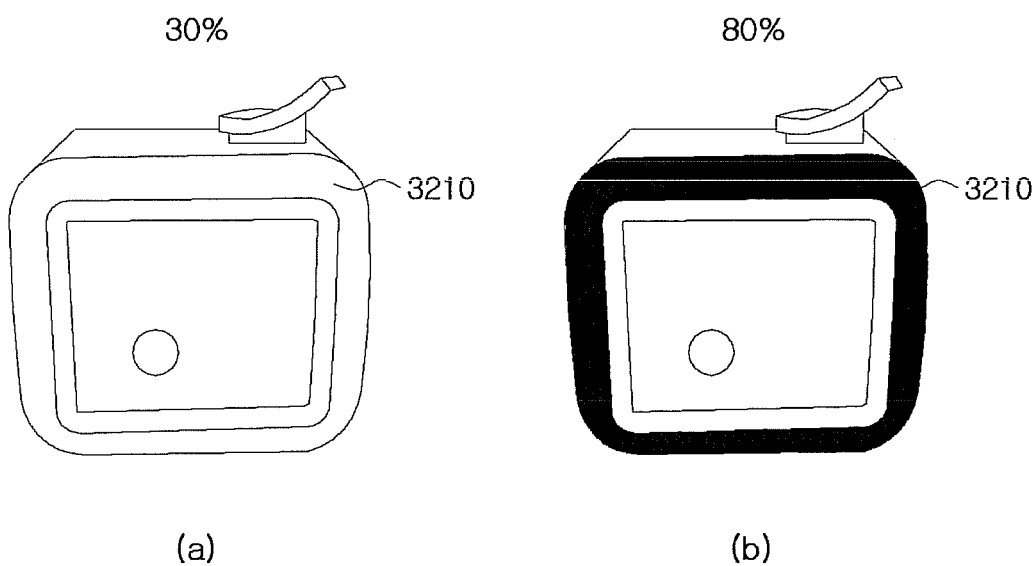

Referring to FIG. 32, the color of the appearance of the humidity control apparatus may be controlled by referring to the information on humidity. In accordance with one embodiment of the present invention, the information on the humidity may be visually displayed as the color of the appearance of the humidity control apparatus by disposing an object region 3210, which is capable of variably displaying colors, in at least some region of the humidity control apparatus, and displaying the color, which corresponds to the information on the sensed humidity, on the object region 3210. For example, when the relative humidity measured by a humidifier is only 20%, a particular color is not displayed on the appearance 3210 of the humidifier (see FIG. 32(a)), and when the relative humidity corresponds to 80%, a blue color may be displayed on the appearance of the humidifier (see FIG. 32(b)). The color of the appearance of the pot may be variably displayed according to the humidity of moisture contained in the pot by using the principle similar to the embodiment.

Further, in accordance with one embodiment of the present invention, the information on the humidity may be visually displayed as the transparency of the appearance of the humidity control apparatus by displaying a transmittance of light, which corresponds to the information on the sensed humidity, on the object region.

Figure 33:
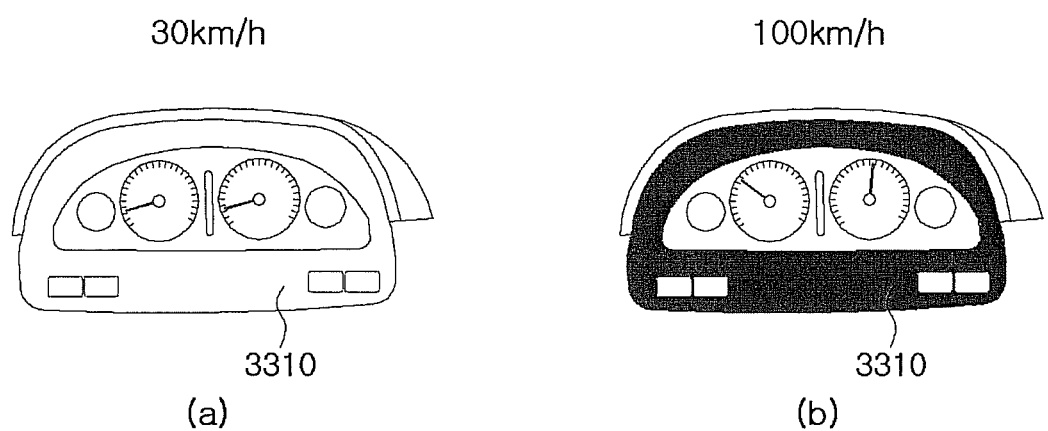

Referring to FIG. 33, the color of the appearance of the motion apparatus, such as a car, a motorcycle, a bicycle, a board, a top or the like, may be controlled by the information on the exercise state. In accordance with one embodiment of the present invention, the information on the exercise state may be visually displayed as the color of the appearance of the motion apparatus, such as a car or the like, by disposing an object region 3310, which is capable of variably displaying colors, in at least some region of the appearance of the motion apparatus such as the car, and displaying a color, which corresponds to the information on the motion state acquired as the result of sensing, such as velocity, acceleration, angular velocity, angular acceleration or the like, of the motion apparatus such as the car, on the object region 3310. For example, when the velocity of the car is only 30 km/h, a particular color is not displayed on a dash board 3310 of the car (see FIG. 33(a)) and when the velocity of the car is rapid as much as 100 km/h, a red color is displayed on the dash board 3310 of the car, and thus, the visual warning may be given to the user (see FIG. 33(b)).

Further, in accordance with one embodiment of the present invention, the information on the exercise state may be visually displayed as the transparency of the appearance of the motion apparatus such as a car, by implementing a transmittance of light, which corresponds to the information on the motion state, on the object region.

That is, the method in accordance with one embodiment of the present invention includes acquiring information sensed by at least one sensing unit (for example, acquiring the temperature of the electric heat apparatus), generating a voltage signal based on the information (for example, generating the corresponding voltage signal based on the temperature), variably controlling at least one of the color and the transparency of the display region of the object based on the generated voltage signal (for example, controlling the color of the frame of the electric field), wherein the wavelength corresponding to the color displayed in the display region may be changed within the single pixel, continuously or in an analog manner, and thus, has several advantages as described above as compared with the method of mixing R, G and B in a digital manner.

[Experimental Results of Display Unit]

Figure 34:
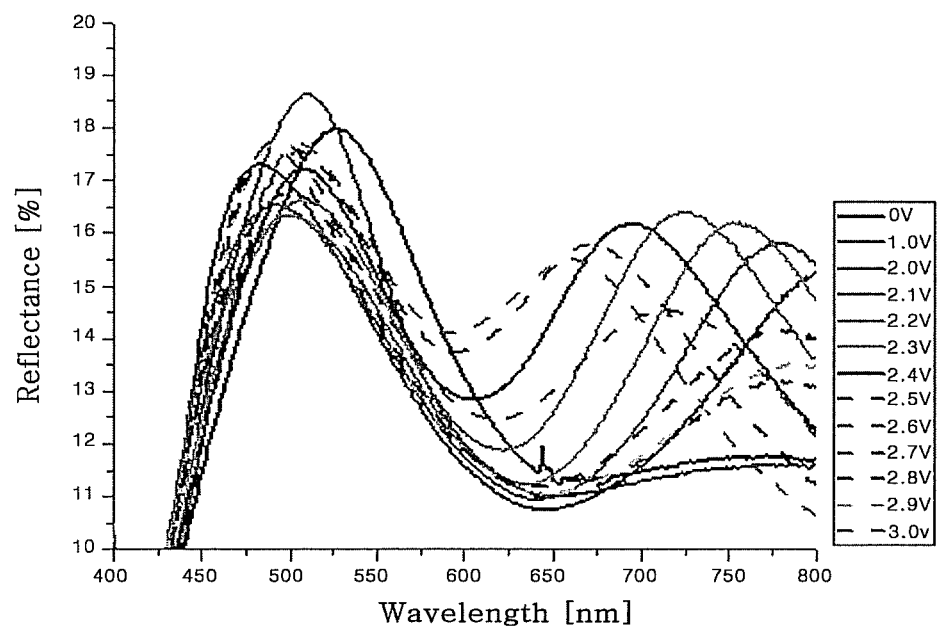
FIGS. 34 and 35 are graphs and photographs illustrating light reflected from the particles as a result of performing an experiment applying an electric field, in a state that the particles having electric charges are dispersed in electrical polarization characteristic, in accordance with one embodiment of the present invention.
Figure 34:
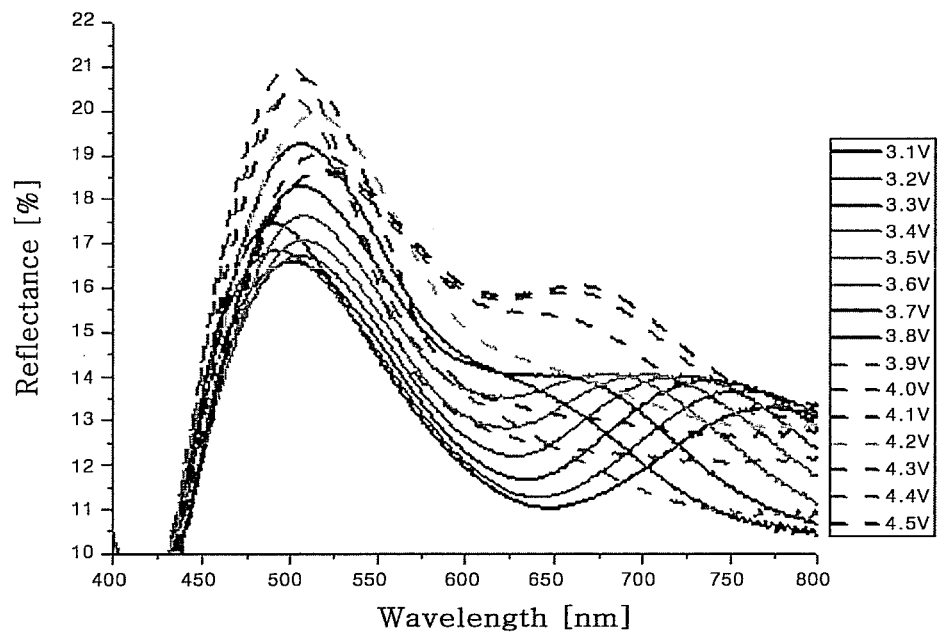
Figure 35:
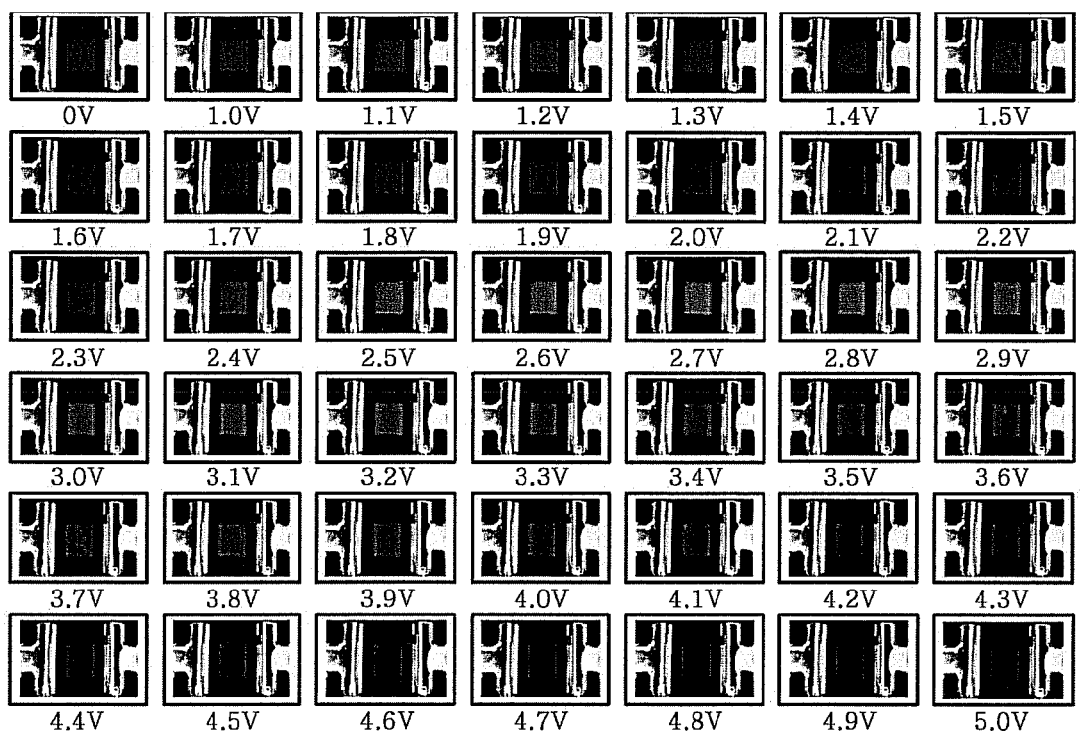

FIGS. 34 and 35 are graphs and photographs illustrating light reflected from particles as a result of performing an experiment applying an electric field, in a state in which the particles having electric charges are dispersed in the solvent having electrical polarization characteristic, in accordance with one embodiment of the present invention. For reference, in the experiment of FIGS. 34 and 35, particles having a size of 100 to 200 nm, charged with negative charges and coated with a silicon oxide film, were used as the particles having electric charges, and a solvent having a polarity index greater than 1 was used as the solvent having electrical polarization characteristic. The intensity of a voltage, which was applied to apply an electric field to the particles the solvent, was set variously in the range of 0 to 5V. Meanwhile, the graphs shown in FIG. 34 depict the reflectance of light reflected from the particles in the wavelength range of the visible light band when electric fields of various intensities are applied. From FIG. 34, it can be seen that the greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 34, it can be seen that a wavelength pattern of light reflected from particles depends on the intensity of an applied electric field (i.e., intensity of a voltage). More specifically, it can be seen that, the higher the intensity of an applied electric field (i.e., intensity of a voltage), the shorter the wavelength of the light reflected from the particles. According to the experimental results of FIG. 34, as the intensity of the applied electric field (that is, the intensity of voltage) is increased, it can be appreciated that the light of light reflected from the particles is changed from a red series to a blue series. Referring to FIG. 35, the change in the color of the reflected light as described above can be visually appreciated.

Figure 36:
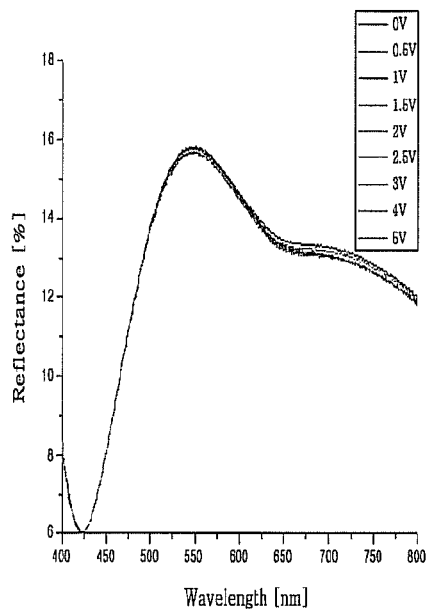
FIGS. 36 and 37 are graphs illustrating a wavelength of light reflected from the particles as a result of performing an experiment applying an electric field, in a state that the particles having electric charges are dispersed in various solvents having different polarity indices, in accordance with one embodiment of the present invention.
Figure 36:
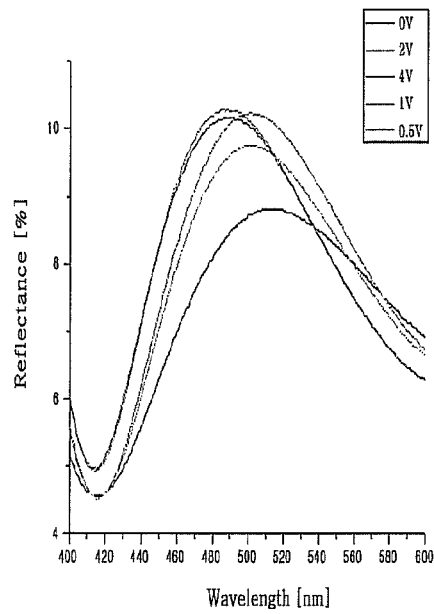
Figure 36:
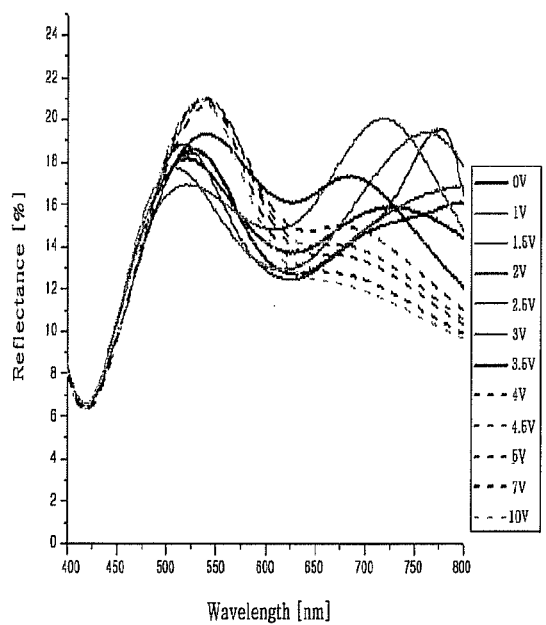
Figure 36:
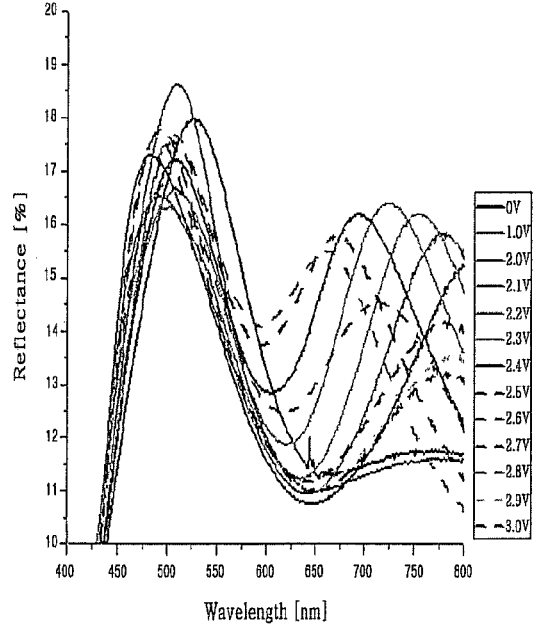
Figure 37:
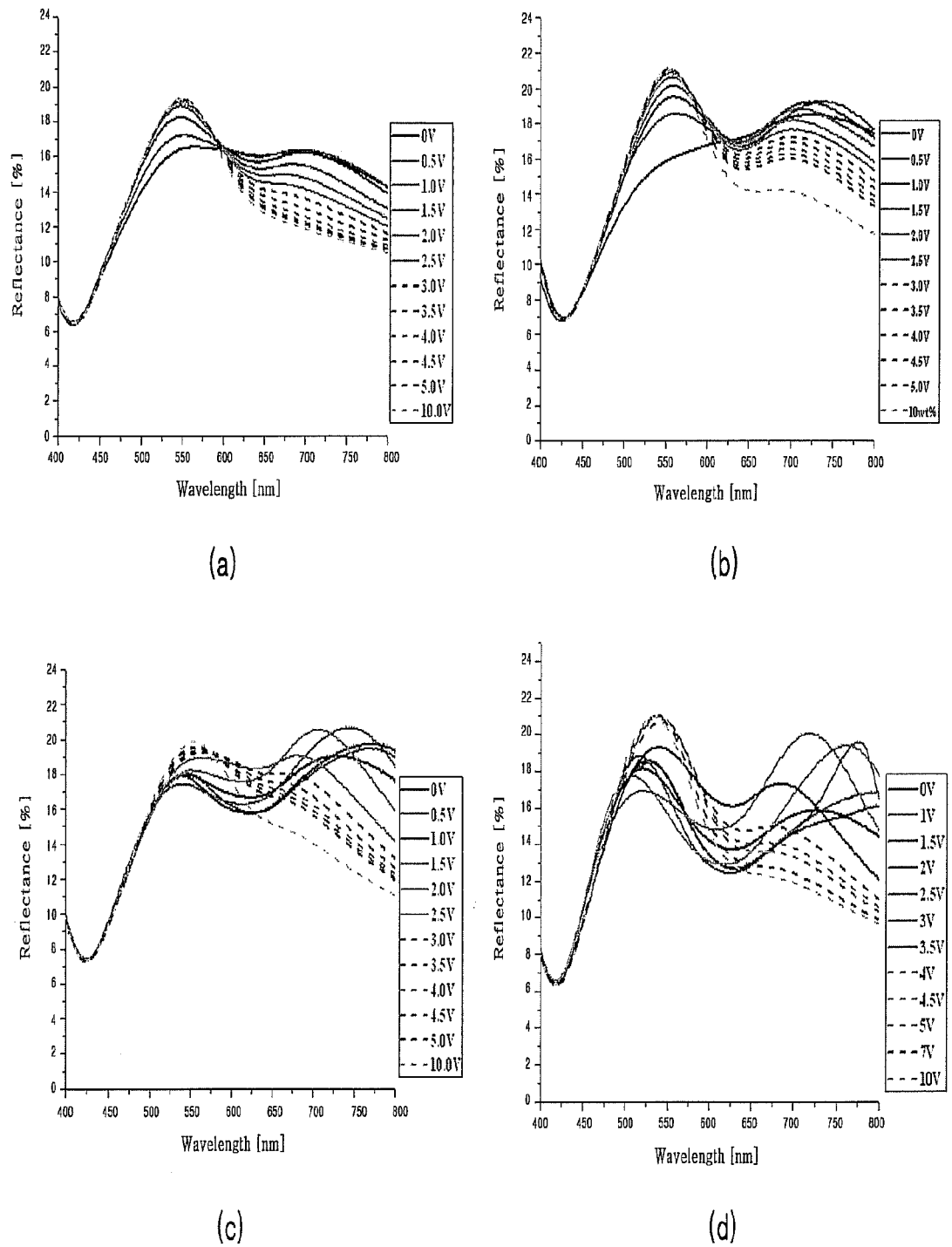

Next, FIGS. 36 and 37 are graphs illustrating a wavelength of light reflected from the particles as a result of performing an experiment applying an electric field, in a state in which the particles having electric charges are dispersed in various solvents having different polarity indices, in accordance with one embodiment of the present invention. For reference, in the experiment of FIGS. 36 and 37, particles having a size of 100 to 200 nm, charged with negative charges and coated with a silicon oxide film, were used as the particles having electric charges, and solvents having polarity indices in the vicinity of 0, 2, 4 and 5 were used as the solvent having electrical polarization characteristic. More specifically, the graphs (a), (b), (c) and (d) of FIG. 36 depict experimental results for the solvents having polarity indices of 0, 2, 4 and 5, respectively, and the graphs (a), (b), (c) and (d) of FIG. 37 depict experimental results for a solvent obtained by mixing a solvent having a polarity index of 0 and a solvent having a polarity index of 4 at ratios of 90:10, 75:25, 50:50 and 0:100, respectively. Meanwhile, the graphs shown in FIGS. 36 and 37 depict the reflectance of the light reflected from the particles in the wavelength range of a visible ray band, when electric fields of various intensities are applied. The greater the degree of change in the wavelength pattern of reflected light with change in the intensity of an electric field, the larger the change in the inter-particle distances. This means that light of more various wavelengths can be reflected from the particles by controlling the intensity of the electric field.

Referring to FIG. 36, from graph (a) showing the experimental result for the solvent having a polarity index of 0, it can be seen that a change in the intensity of an electric field (i.e., intensity of a voltage) causes almost no change in the wavelength pattern of reflected light between the different voltages. It can be seen that the higher the polarity index (i.e., as the experimental results proceed toward graph (d) from graph (a)), the greater the change in the wavelength pattern of reflected light with changes in the intensity of an electric field (i.e., intensity of a voltage). Further, referring to FIG. 37, it can be seen that, the higher the ratio of the solvent having a high polarity index (i.e., as the experimental results proceed toward graph (d) from graph (a)), the greater the changes in the wavelength pattern of reflected light with changes in the intensity of the electric field (i.e., intensity of a voltage).

From the experimental results discussed above, it can be seen that, with the display apparatus in accordance with one embodiment of the present invention, photonic crystals capable of reflecting light of a certain wavelength can be realized in the first mode by properly adjusting the charge amount and/or polarization amount of the particles, the polarization amount of the solvent, and/or the intensity of an applied electric field, and accordingly a display of full spectrum can be realized.

Figure 38:
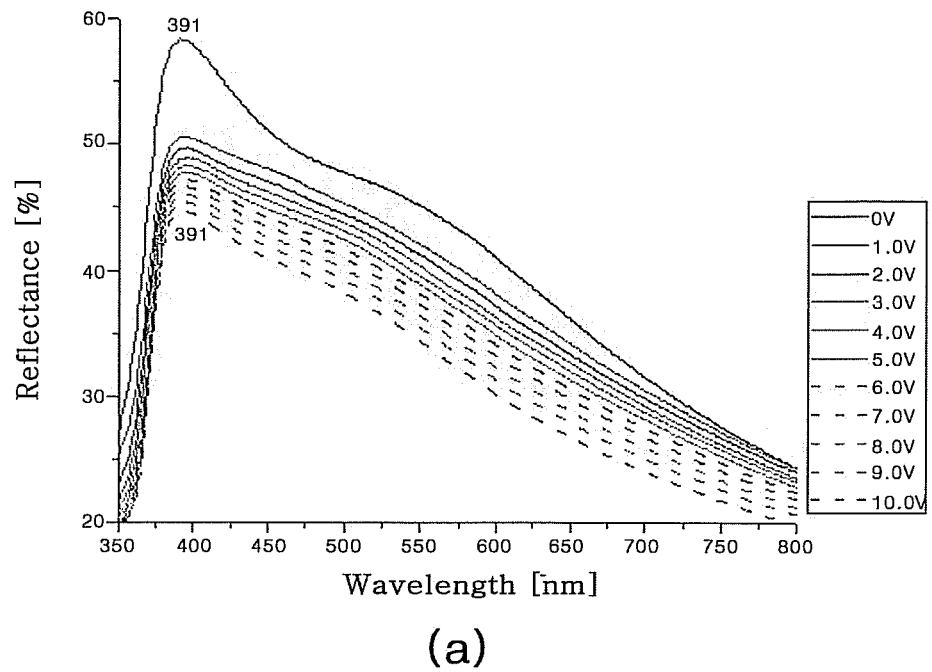
FIGS. 38 and 39 are graphs and photographs illustrating light reflected from the particles as a result of performing an experiment applying an electric field, in a state that the particles having electric charges and particles having electrical polarization characteristic are dispersed in the solvent in accordance with one embodiment of the present invention.
Figure 38:
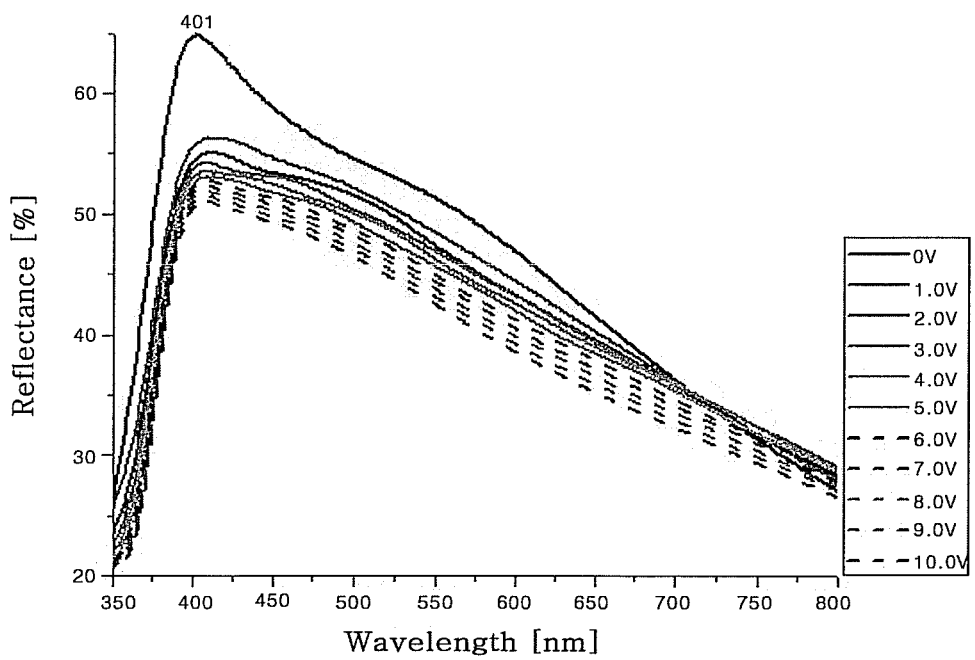
Figure 39:
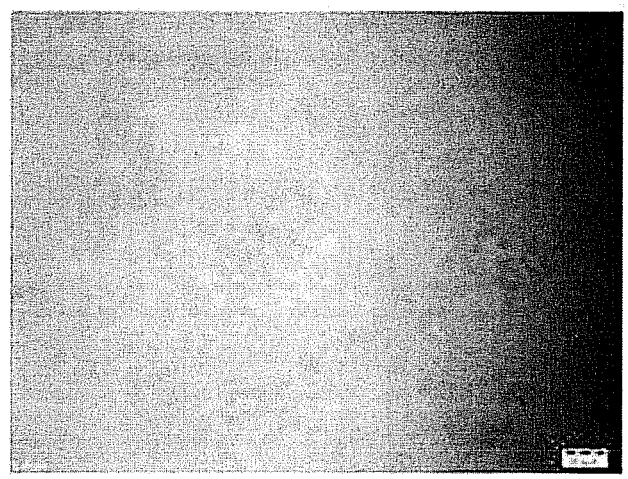
Figure 39:
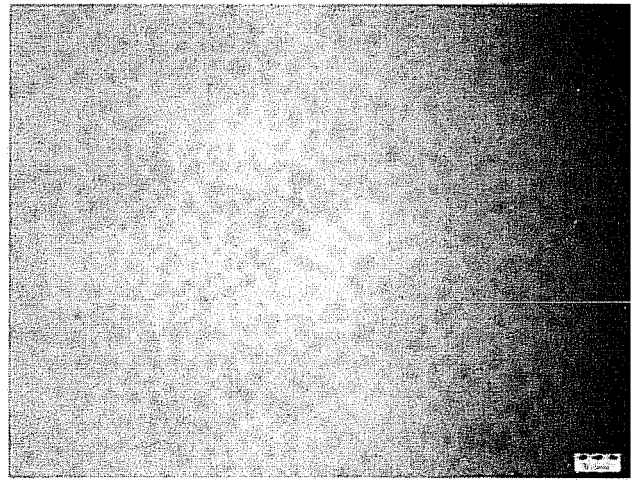

Next, FIGS. 38 and 39 are graphs and photographs illustrating light reflected from the particles as a result of performing an experiment applying an electric field, in a state in which the particles having electric charges and having electrical polarization characteristic are dispersed in the solvent, in accordance with one embodiment of the present invention. For reference, in the experiment of FIGS. 38 and 39, $SrTiO_3$ particles (see FIG. 38(a)) and $BaTiO_3$ particles (see FIG. 38(a)), both of which are charged with electric charges, were used as the particles having electric charges and electrical polarization characteristic, and the particles were dispersed in a solvent having a polarity index of 0.

Referring to FIG. 38, it can be seen that the higher the intensity of an electric field applied to the particles and the solvent, the lower the reflectance of light on the whole. From this experimental result, it can be concluded that upon application of an electric field, the particles dispersed in the solvent can be electrically polarized and arranged in the direction of the electric field (see FIG. 39(b)), and this arrangement leads to a decrease in the number of particles capable of reflecting incident light and reduces the reflectance of light. Although this experiment does not involve a sharp change in the wavelength of reflected light which will be produced using a configuration, in which an electric field is applied in a state that particles having electrical polarization characteristic are dispersed in a nonpolar solvent, it was found that the particles are arranged in a constant direction as the electric field is applied. Therefore, it can be known that it becomes possible to change the wavelength of the reflected light by optimizing a condition such as the electric charge on the surface of the particles.

Figure 40:
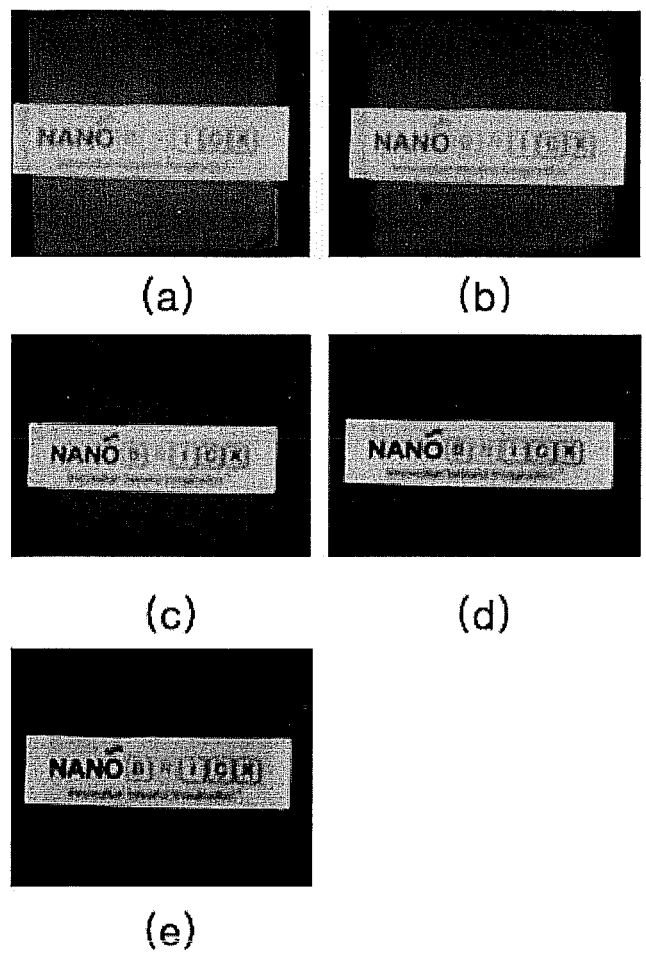
FIG. 40 is a diagram illustrating experimental results for a configuration of implementing a transparent display in accordance with one embodiment of the present invention.

Next, FIG. 40 is a view illustrating experimental results for a configuration of implementing a transparent display in accordance with one embodiment of the present invention. For reference, in the present experiment, the particles, the solvent and the electrode, which are made of the transparent material transmitting the light in the visible ray band, were used. The transparency of the display is visually observed, as the intensity of the electric field, which is applied to the display apparatus using the photonic crystal characteristic, is gradually increased.

Referring to FIG. 40, it can be appreciated that when the intensity of the electric field is relatively small, the predetermined color is displayed on the display apparatus as the light in the visible ray band is reflected by the photonic crystals (see FIGS. 40(a) and 40(b)). However, when the intensity of the electric field is relatively large, the wavelength range of light reflected by the photonic crystals is gradually moved from the visible ray band to the ultraviolet band, and thus, it can be appreciated that the color displayed on the display apparatus is appreciably light (see FIG. 40(c)). When the intensity of the electric field is larger, as the wavelength range of light reflected by the photonic crystals is completely out of the visible ray band, it can be appreciated that the display apparatus is in the transparent state while displaying no color (see FIGS. 40(d) and 40(e)). By using such a characteristic, the display apparatus in accordance with one embodiment of the present invention may be used for a smart glass such as the variable color glass or the like.

Figure 41:
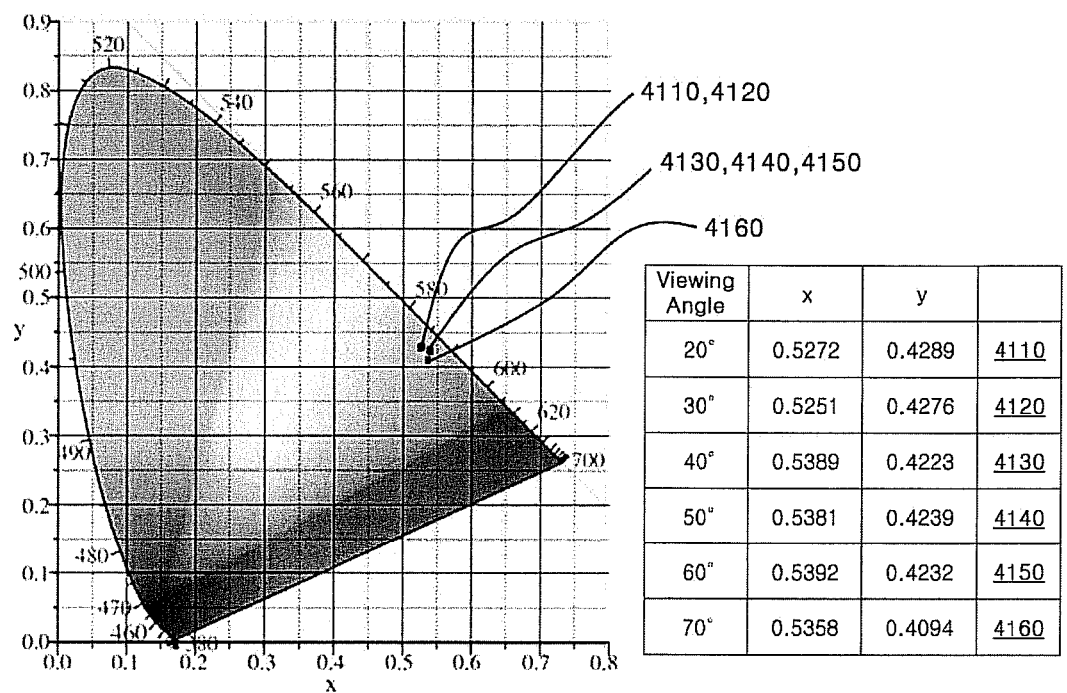
FIG. 41 is a diagram illustrating results of an experiment about display performance (that is, results of the experiment about the viewing angle of the display) according to a viewing angle of the display apparatus in accordance with one embodiment of the present invention.

FIG. 41 is a diagram illustrating results of an experiment about display performance according to a viewing angle of the display apparatus (that is, results of the experiment about the viewing angle of the display), in accordance with one embodiment of the present invention.

Referring to FIG. 41, even though the viewing angle of the display apparatus according to one embodiment of the present invention is changed from 20° to 70°, it can be seen that color patterns 4110 to 4160 of the reflected light is little changed. The photonic crystal display apparatus according to the related art has a disadvantage in that the change in the color patterns is great according to the viewing angle. However, it can be seen that the display apparatus in accordance with the present invention has an advantage in that the change in the color patterns is constant without almost any change. It is understood that this advantage derives from the fact that the photonic crystals formed by the display apparatus in accordance with the present invention are quasi crystals having a short range order. Accordingly, the display apparatus in accordance with the present invention can greatly improve display performance in comparison with the conventional display apparatus which merely forms photonic crystals having a long range order. As shown in the drawings, in accordance with one embodiment of the present invention, even when the viewing angle is change between 20° and 70°, the reflected light is changed within 5% of an x value and a y value in CIE xy chromaticity coordinates. Further, in accordance with one embodiment of the present invention, the reason why the short range order is generated that the electric field is generated by applying the DC voltage. By doing so, the particles are regularly arranged by three-dimensionally in the arrangement of the short range order. Thereby, it becomes possible to obtain more excellent viewing angle characteristic than in the case of the conventional display apparatus having the long range order. In addition, in order to make the viewing angle characteristic excellent, it is preferable to form the electric field by applying DC voltage or AC voltage including the DC voltage component. The transmittance tuning and the color control may be very widely performed within the single pixel when DC and AC are used in combination. The use of DC and AC is described in detail in the following mode switching component portion.

[Maintaining of Color]

In accordance with one embodiment of the present invention, even after the electric field acting to control the inter-particle distances is blocked, the inter-particle distances may be maintained in the controlled state. To this end, the predetermined additives may be included in the solvent in which the particles are dispersed.

More specifically, in accordance with one embodiment of the present invention, a polymer type material with a complicated molecular structure such as a dispersant (for example, polyoxyethylene lauryl ether, etc.) with a portion having strong affinity (i.e., anchoring group, hereinafter, referred to as "anchor") and a polysorbate-based dispersant (for example, polyoxyethylene sorbitan monolaurate, polyoxyethylene sorbitan monooleate, polyoxyethylene sorbitan monostearate, etc.) with at least one anchor may be added as additives. Accordingly, the motion of the particles dispersed in the solvent is limited by the additives.

In addition, in accordance with one embodiment of the present invention, when the particles having electric charges are dispersed in the solvent to which the polymer having the molecular chain is added, resistance is increased as the particles are moved in the solvent, such that their locations may be fixed even after the electric field applied from the outside is blocked.

In addition, in accordance with one embodiment of the present invention, additives, which have a functional group existing at the particle surface and a functional group (hydrophilic group) such as hydrogen binding that can be chemically bonded, are added within the solvent, so that the additives are continuously adsorbed on the particle surface. Therefore, a film is formed around the particles, thereby stabilizing the particles.

In addition, in accordance with one embodiment of the present invention, as the steric effect is generated by alkyl component existing in the alkyl chain of the lipophilic group that is included in the additives added within the solvent, the viscosity of the solvent may be increased, thereby limiting the motion of the particles included in the solvent. Further, a large amount of polymer having the complicated structure is added within the solvent, thereby further increasing the viscosity of the solution.

That is, the additives having the affinity with the particles or the additives having the affinity with the solvent are added, thereby limiting the motion of the particles within the solvent. In addition, the polymer having the complicated steric structure or chain structure is added within the solvent as the additives, thereby limiting the movement of the particles due to the complicated structure of the additives.

Meanwhile, the phase change material is used as the solvent, and thus, the inter-particle distances are controlled to have a predetermined distance by applying voltage in the state of facilitating the movement of the particles (for example, a liquid having low viscosity). Further, before the outer voltage is blocked, a state of a solution is converted into a state (for example, a solid or a liquid having high viscosity) that makes the movement of the particles hard through stimuli such as light, pressure, temperature, chemical reaction, magnetic field, electricity, etc. As a result, the inter-particle distances of the particles may be maintained constantly even though the external voltage is blocked.

Alternatively, in order to prevent the inter-particle distances from being gradually disordered after voltage is blocked, the inter-particle distances may be maintained at the predetermined distance by periodically refreshing the predetermined voltage.

In order to constantly maintain the distance even after the voltage is blocked by the above-mentioned method, it is preferable to minimize the specific gravity of the particles and the solvent, such that materials having different specific gravity may be coated on the particles or materials having different specific gravity may be added to the solvent.

Therefore, in accordance with one embodiment of the present invention, the particles regularly arranged while maintaining the predetermined distance according to the electric field may maintain the regular arrangement even though the electric field is blocked. Such an effect may be apparently shown as the amount of additives is large or the molecular weight of additives is large. In particular, the above effect may be increased by reducing the difference in the specific gravity between the particles and the solvent. In addition, in accordance with one embodiment of the present invention, the display apparatus having the excellent display characteristic may be manufactured by simply including the additives in the solvent without adopting the complicated configuration such as capsule, cell, droplet type capsule, etc.

In addition, in accordance with one embodiment of the present invention, a configuration in which the polymer stabilizer is covalently bonded with the particles can be considered. The polymer stabilizer and the particles have the complementary chemical functionality with each other so as to forming the covalent binding. The polymer stabilizer may be added within the solvent.

In addition, in accordance with one embodiment of the present invention, the particles may be coated with polymer and the polymer coating may include the first functional group. In addition, the polymer having the second functional group may be added within the solvent and the second functional group may act to apply attraction to the first functional group, such that the polymer within the solvent may form a complex with the particles.

Even after the electric field is blocked, the hues continue to be maintained on the display unit, such that the power consumption becomes small and the hues of a frame or an exterior may continue to be stably and reliably maintained.

Meanwhile, in accordance with one embodiment of the present invention, a configuration may be considered, which includes a net structure including a functional group in a gel-type solution and particles that are dispersed the gel solution and the functional group, and further, the functional group of the particles and the functional group of the net structure are bonded with each other.

In one embodiment, the functional group of the gel-state solution or the functional group of the particles may include at least one of hydroxyl group (—OH), carboxyl group (—COOH), amine group (—NH$_2$), amid group (CONN), formyl group (—CHO), thiol group (—SH) and acrylic group (—CH$_2$CCOR).

In one embodiment, the gel-state solution may include aqueous polymer of at least one of polyvinyl alcohols, agaroses, poly (N-isopropylacrylamide)s, polysaccharides, polyamides and polyacrylates.

In one embodiment, the gel-state solution may include monomer or polymer including a lipophilic group and a reactive functional group that have a long chain within a molecule, such as 12-hydroxystearic acid, sorbitan esters (Sorbitan monostearate, sorbitan monooleate, etc.) and polysorbates (polyoxyethylene sorbitan monooleate, etc.).

In one embodiment, the gel functional group of the solution and the functional group of the particles may be bonded with each other by a cross-linking agent, which has a bifunctional group including at least one of boric acid, dialdehydes, dicarboxylic acids, dianhydrides, acid chloride, epichlorohydrin and hydrazide.

In one embodiment, the binding between the functional group of the surface of the particles and the functional group included in the solution may be performed, by applying the heat energy or the photo energy or adding the additives or the cross-linking agent.

In one embodiment, the gel-state solution may be phase-changed into the sol state by applying the heat energy or the photo energy or adding the additive or the cross-linking agent.

[Mode Switching Configuration]

Figure 42:
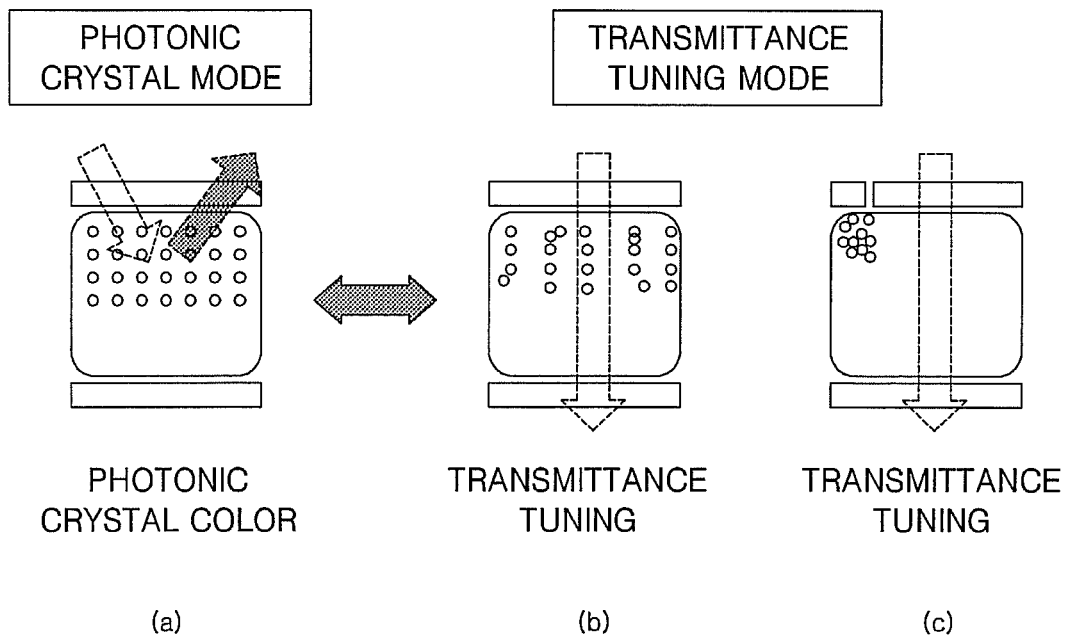
FIG. 42 is a diagram illustrating one example of mode switching in accordance with one embodiment of the present invention.

FIG. 42 is a diagram illustrating one example of mode switching in accordance with one embodiment of the present invention. In one embodiment of the present embodiment, the "photonic crystal mode" means that the color of the reflected light within the specific wavelength is represented by controlling the inter-particle distances, and the "transmittance tuning mode" means that the light incident to the display region transmits at least one of the particles and the solvent of the corresponding display region to make the color or the shape of an object, which is at an opposite side to an observer, be represented. FIG. 42 shows a configuration in which the photonic crystal mode and the transmittance tuning mode in the display region forming the single appearance surface or the single frame surface or the single frame surface are selectively switched. Regarding the principle showing the switching configuration, if the magnitude in voltage exceeds the specific magnitude when voltage is applied to any one transparent electrode and the applied voltage is the DC voltage, the arrangement of the particles is arrayed as in FIG. 42(b), and thus, its transparency is tuned. Meanwhile, when the magnitude of the applied voltage is the specific voltage or less, the photonic crystal color is generated as shown in FIG. 42(a), and thus, the wavelength of the desired color may be implemented by controlling the inter-particle distances, by controlling the relative intensity of voltage at the specific voltage or less. Meanwhile, if the applied voltage is the AC voltage and the applied voltage exceeds the specific voltage, then the photonic crystal color is generated and the arrangement of the particles is arrayed, and thus, its transparency is tuned. In addition, in the case of the transmittance tuning mode (c), voltage is applied only to the very small partitioned electrode to collect particles to the corner, and thus, the mode of tuning the transparency may also be considered as in the (c) mode. Although exaggeratedly shown for description in the drawing, the small partitioned electrode is very small when compared to the large electrode next thereto. Therefore, the large electrode is shown like occupying the entire portion of the upper electrode. As a result, the mode of switching between the mode of the FIG. 42(a) and the mode of FIG. 42(b) may be performed, by applying voltage only to the large electrode. If the particles can be collected to the corner, the voltage that is stronger than in case of the modes (a) and (b) needs to be applied. Various colors or the light transparency tuning may be implemented within a single frame or a single pixel of the single frame, by switching between the photonic crystal mode and the transmittance tuning mode according to the magnitude in the voltage. Meanwhile, although not shown by arrow in the drawings, the transmittance tuning mode (b) and the transmittance tuning mode (c) may be controlled according to the intensity of voltage, and thus, various transmittance of light may be implemented.

Figure 43:
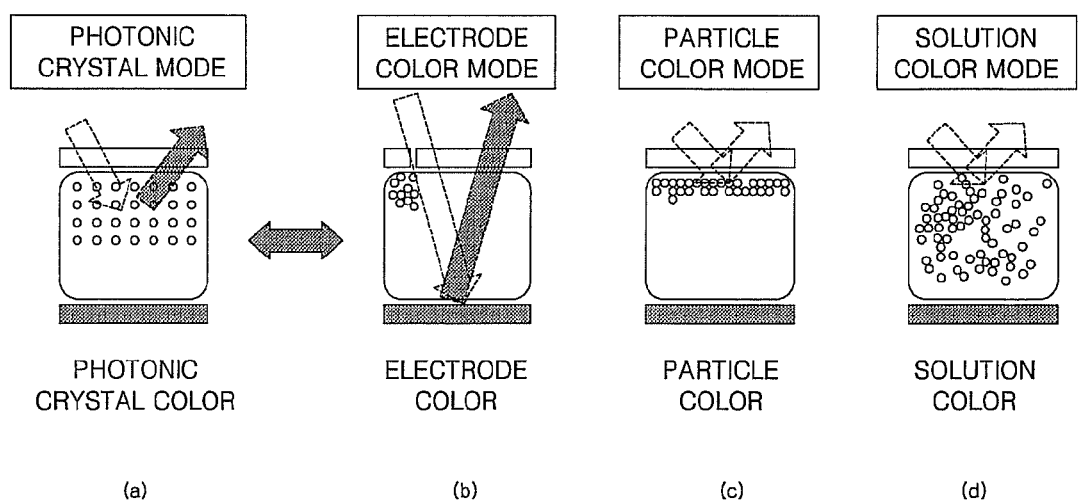
FIG. 43 is a diagram illustrating one example of mode switching in accordance with one embodiment of the present invention.

FIG. 43 is a diagram illustrating one example of mode switching in accordance with one embodiment of the present invention. In one embodiment of the present invention, the "photonic crystal mode" means that the color of the reflected light having the specific wavelength is represented by controlling the inter-particle distances as described above, the "particle color mode" means a mode that represents the unique color of particles, the "solution color mode" means a mode that reflects a color by the mixed color of the particles and solvent or the scattered color due to scattering between the particles and solvent or the combination of the mixed color or scattered color, and the "electrode color mode" means a mode that reflects the color (e.g., black in one embodiment) of the lower electrode. FIG. 43 shows a configuration in which the photonic crystal mode and the particle color mode or the solution color mode or the electrode color mode are switched to one another within a single appearance surface or a single frame surface or a single pixel of a display region forming the single frame surface. In addition, the electrode color mode, the particle color mode and the solution color mode may be selectively switched to one another (since no arrow is shown between the modes in the drawing, it may be shown that the switching is not performed therebetween, but the switching can be actually performed). In addition, as described above, in FIG. 43(b), the very small partitioned electrode has a very small area when compared to the large electrode next thereto partitioned in a partition manner. Therefore, when being viewed from the top, due to the very small area of the partitioned electrode, only the large electrode may be shown. As a result, when voltage is applied to the large electrode, the implementation method is substantially the same as the effect of applying voltage to the single upper electrode of FIGS. 43(a), 43(c) and 43(d). Regarding the principle showing the switching configuration, when a very strong voltage (greatly exceeding the specific voltage) is applied to a transparent electrode, which is a transparent one out of a plurality of electrodes, the particles having electric charges are collected to the electrode at any one side (i.e., the upper electrode in FIG. 43(c)), and thus, a unique color is shown from the top (in this case, the upper electrode is the transparent electrode and has a sign opposite to the electric charge of the particles). Similar to this case, as in the case of (b), when a voltage is not applied to the large electrode but a very strong voltage is applied to a very small electrode, the particles are collected to the corner, thereby implementing the electrode color mode, in which the color of the lower electrode is reflected. Then, when the voltage above the specific voltage but lower than the above very strong voltage is applied, the photonic crystal mode is generated (see FIG. 43(a)), as described above. Further, when a very weak voltage is applied or no voltage is applied, the solution color mode is implemented, as described above. The switching between the photonic crystal mode, the particle color mode, the solution color mode and the electrode color mode may be performed within a single frame or a single pixel in the single frame, thereby implementing very various colors. In addition, it is possible to perform selective switching among the particle color mode, the electrode color mode and the solution color mode.

Figure 44:
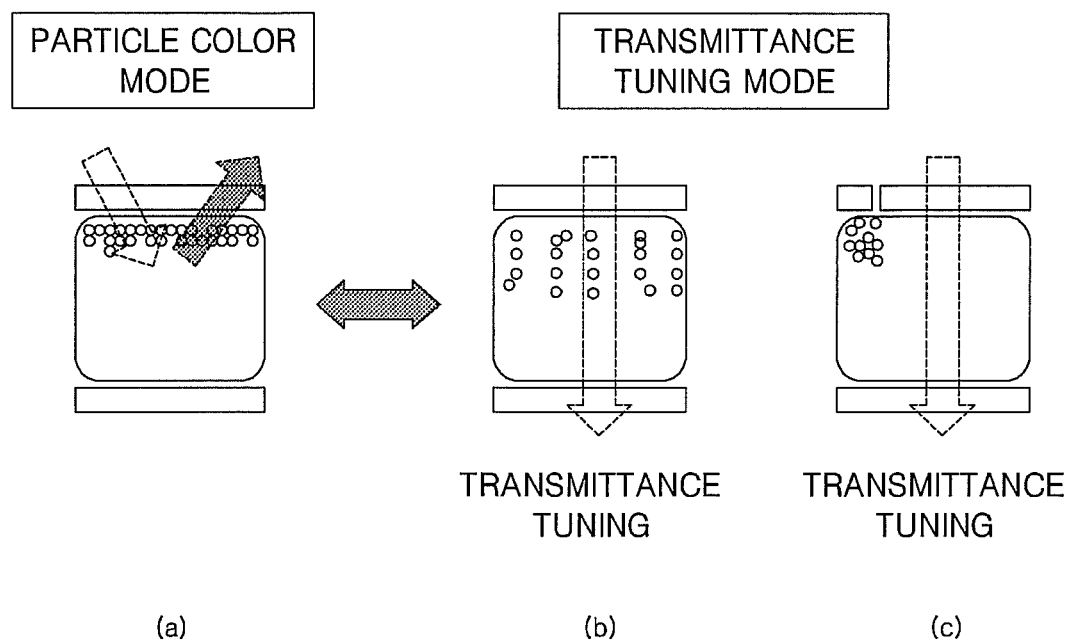
FIG. 44 is a diagram illustrating one example of mode switching in accordance with one embodiment of the present invention.

FIG. 44 is a diagram illustrating one example of mode switching in accordance with one embodiment of the present invention. Here, the "particle color mode" or the "particle color mode" and the "transmittance tuning mode" are similar to the above-mentioned case. That is, even in this case, when a very strong voltage is applied to a transparent electrode, which is a transparent one out of a plurality of electrodes, the particles having electric charges are collected to the electrode at any one side, and thus, the unique color of the particles is shown when being viewed from the top (in this case, the upper electrode is the transparent electrode and has the sign opposite to the electric charge of the particles). In the case in which the applied voltage is DC, when the applied voltage is higher than the voltage that generates the photonic crystal mode, and in the case in which the applied voltage is AC, the applied voltage is lower than the voltage that generates the photonic crystal mode, the arrangement of the particles is arrayed, and thus, the transmittance of light is tuned (see the center of FIG. 44). Meanwhile, when a very strong voltage is applied to a very small electrode, the particles are collected to the corner, and thus, when the lower electrode is also a transparent electrode, an object, which is at an opposite side to the lower electrode, is shown (see the left of FIG. 44). Therefore, the transmittance of light may be tuned within a single frame or a single pixel of the single frame, and further, the color of frame may be controlled.

Figure 45:
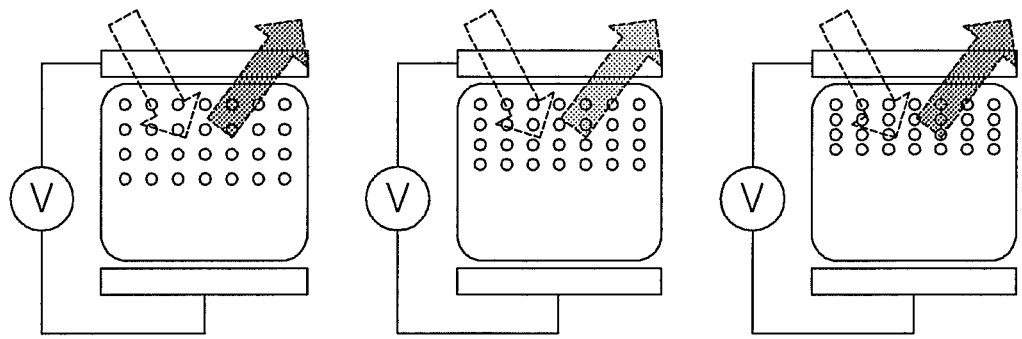
FIG. 45 is a diagram illustrating one example of a photonic crystal mode in accordance with one embodiment of the present invention.

FIG. 45 is a diagram illustrating one example of a photonic crystal mode in accordance with one embodiment of the present invention. As shown, when the intensity of voltage is relatively weak, red is implemented; when the intensity of voltage is relatively strong, blue is implemented; and when the intensity of voltage is intermediate, green is implemented. The difference in the color implementation is performed by controlling the inter-particle distances.

Figure 46:
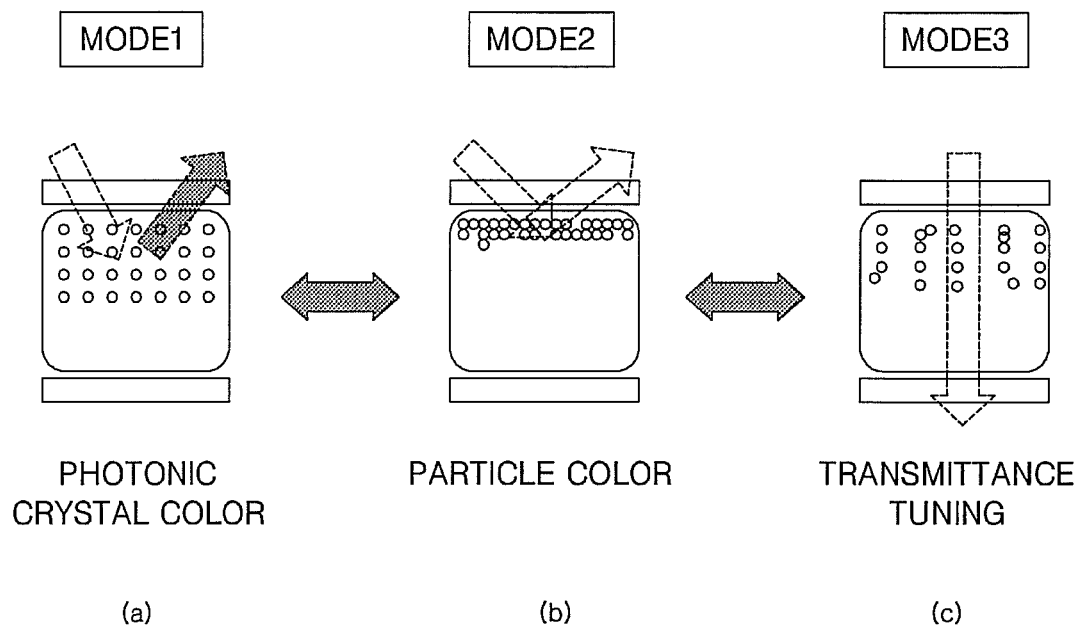
FIG. 46 is a diagram illustrating one example of mode switching in accordance with one embodiment of the present invention.

FIG. 46 is a diagram illustrating one example of mode switching configuration in accordance with one embodiment of the present invention. In FIG. 46, Mode 1 corresponds to the photonic crystal mode, Mode 2 corresponds to the particle color mode, and Mode 3 corresponds to the transmittance control mode. For example, regarding the magnitude in the applied voltage, when the applied voltage is the DC voltage, the particle color mode is the largest, the transmittance tuning mode is the second largest, and the photonic crystal color mode is the third largest. When the applied voltage is the AC voltage, the particle color mode is the largest, the photonic crystal mode is the second largest, and the transmittance control mode is the third largest. That is, the photonic crystal mode, the particle color mode, and the transmittance control mode may be selectively switched within a single frame or a pixel in the single frame. Thereby, various colors or the transmittance of light may be implemented within the single frame or the single pixel in the single frame. As well known to those skilled in the art, the "pixel" means the minimum display unit that may be independently controlled.

Hereinabove, although the present invention is described by specific matters such as concrete components, exemplary embodiments and drawings, they are provided only for assisting in the entire understanding of the present invention. Therefore, the present invention is not limited to the exemplary embodiments. Various modifications and changes may be made by those skilled in the art to which the present invention pertains from this description.

While the invention has been shown and described with respect to the particular embodiments, it will be understood by those skilled in the art that various changes and modification may be made without departing from the spirit and scope of the invention as defined in the following claims.

For example, as the field to which the technical idea of the present invention is applied, there are a mobile apparatus (e.g., mobile phone, notebook, PMP, etc.), home appliances (e.g., refrigerator, TV, speaker, coffee port, etc.), IT furniture (e.g., closet, table, chair, etc.), digital accessories (e.g., bracelet, necklace, etc.), digital clothes (e.g., jacket, etc.) or the like.

In addition, although not specifically shown in the drawings, as the building exterior material, there may be an exterior material having the surface of which the color is changed according to the radiating intensity of solar light; as the portable electronic apparatus, the color of the surface of its frame may be changed between when the apparatus is moving and when the apparatus is stopped; and as the game apparatus, the color of the surface of its frame may also be changed between the battle state and the non-battle state.

In addition, although not described above, when using the temperature sensor, the color of the surface of the electronic apparatus or the building is changed, which can be advantageous for the user. For example, summer in which temperature is high, the color of the mobile phone can become blue, and thus, the user can experience cool feeling. In addition, in summer in which temperature is high, the color of an outer wall of building may be changed to a cool color. Meanwhile, when the temperature is high, the color can be changed to a color that does not absorb heat. In addition, the color of the mobile phone may be changed according to the temperature of the mobile phone. In addition, even in the case of the gyro sensor, when the mobile phone is strongly shaken, the color of the mobile phone can become red; and when the mobile phone is lightly shaken, the color thereof can become yellow. For example, in the building in which the quite state needs to be maintained, when sound is increased, the color or the outer wall of building may be changed to red.

In addition, although not described in detail above, the color of the frame of the mobile communication apparatus may be automatically changed according to the type of a caller that issues a call. For example, when the caller is a familiar acquaintance, the color of the frame may be changed to blue; and when the caller is a non-known phone number, the color may be changed to red.

Figure 47:
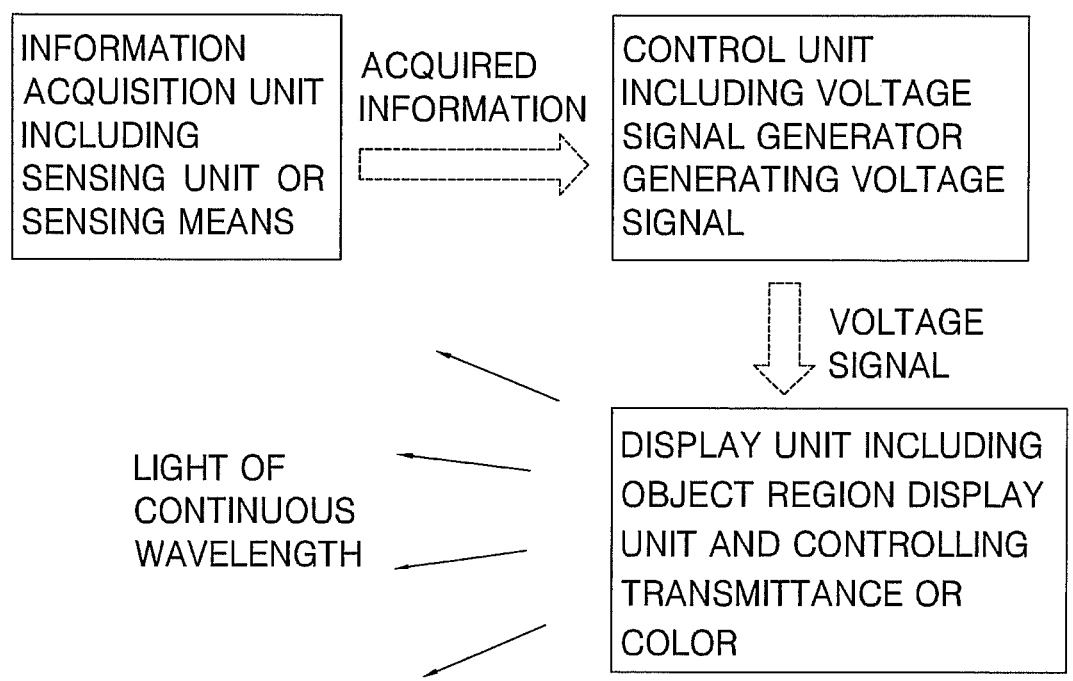
FIG. 47 is a schematic block diagram of an apparatus in accordance with one embodiment of the present invention.

Meanwhile, in order to exemplarily describe the present invention, a configuration may be considered, which comprises a sample region display unit, an object region display unit and a control unit may be considered (see FIG. 21), or comprises a detecting or sensing unit (throughout the specification, "sensing" or "detection" may be alternatively used, as well understood by those skilled in the art), the control unit and the object region display unit (see FIG. 24). However, the display apparatus or apparatus of the present invention (that is, the case in which the display apparatus is embedded or included in a specific apparatus) is not limited thereto. That is, according to the present invention, the sensing unit may correspond to or be included in an information acquisition unit that acquires the predetermined information by using at least one sensing unit; the control unit may correspond to the voltage signal generating unit that generates the voltage signal based on the information acquired from the information acquisition unit; and the object region display unit may correspond to or be included in the display unit that displays the specific color based on the voltage signal. FIG. 47 is a schematic block diagram of an apparatus in accordance with a preferred embodiment of the present invention. The configuration of generating the voltage signal based on the acquired information is well known to those skilled in the art, and therefore, the detailed description thereof will be omitted.

In addition, the above embodiment separately suggests a configuration, in which when the user selects at least one from several sample colors displayed on the sample region display unit and the selected color is displayed in the object region display unit, and a configuration, in which the color in the object region display unit is controlled based on the information sensed by the sensing unit, but since the former configuration may be performed by the touch sensor in the sample region display unit, and therefore, the former configuration may be considered as a part of the latter configuration.

While the invention has been shown and described with respect to the particular embodiments, it will be understood by those skilled in the art that various changes and modification may be made without departing from the spirit and scope of the invention as defined in the following claims.

What is claimed is:

1. A method, comprising:
acquiring information sensed by using at least one sensing unit;
generating a voltage signal based on the acquired information;
variably tuning color and a transmittance of a display region of an object based on the generated voltage signal, wherein, in the display region, a solution, which comprises a solvent and a plurality of particles dispersed in the solvent, is provided between two or more electrodes in which one of the electrodes is transparent, and the solution shows a variable electrical polarization characteristic, in which an induced electrical polarization quantity is changed according to a change in electric field;
variably tuning the color of the display region of the object by changing a distance between each particle of the plurality of particles to the substantially same extent such that the particles are evenly separated each other to the same extent so as to change a wavelength of light reflected from the particles; and
variably tuning the transmittance of the display region of the object by applying the electric field only to the specific portion of the electrode to move the particles to the specific portion of the electrode,
wherein the color and the transmittance of the display region of the object is variably tuned by applying electric field corresponding to the voltage signal between the electrodes to which the solution is provided, and tuning at least one of the intensity and direction of the electric field to control the distance between each particle of the plurality of particles and to control the location of the plurality of particles,
wherein the particles have an electric charge of the same sign, and
as the electric field is applied, the distance between each particle of the plurality of particles reach a specific range by an interaction of electrophoretic force that is applied to the particles in proportional to the intensity of electric field, electrostatic attraction that is applied between the particles by the variable electric polarization characteristic and electrostatic repulsion that is applied between the particles having the electric charge of the same sign, and thus, as the distance between each particle of the plurality of particles reach the specific range, light having a specific wavelength is reflected from the plurality of particles,
wherein the plurality of particles show a steric effect, and as the electric field is applied, the distance between each particle of the plurality of particles reach the specific range by an interaction of the electrostatic attraction that is applied between the particles by the variable electric polarization characteristic and the steric hindrance repulsion, and thus, as the distance between each particle of the plurality of particles reach the specific range, light having a specific wavelength is reflected from the plurality of particles,
wherein when the electric field is applied, the particles are arranged three-dimensionally with having short range ordering within the solvent, and
wherein a first polarization region is formed to include a first particle of the plurality of particles and solvent within a region that is affected by an electrical attraction by an electric charge of the first particle, and a second polarization region is formed to include a second particle of the plurality of particles and solvent within a region that is affected by an electrical attraction by an electric charge of the second particle, wherein each of the first polarization region and the second polarization region acts like one large electrically polarized particle and interacts with one another.

2. The method of claim 1, wherein the wavelength of the reflected light is changed continuously or in an analog manner.

3. The method of claim 1, wherein the acquiring of the information includes acquiring surrounding environment information of the object.

4. The method of claim 1, wherein the acquiring of the information is performed by the user of the object.

5. The method of claim 1, wherein the acquiring of the information is performed by displaying sample colors that gradually change on a sample region and by allowing a user to select at least one color of the sample colors displayed on the sample region.

6. The method of claim 1, wherein the solvent is made of a visible transmissive material, and when a wavelength of light reflected from the particles corresponds to infrared ray band or ultraviolet ray band, the display region becomes transparent in the visible ray band.

7. The method of claim 1, wherein the solution has a variable electric polarization characteristic by any one of electronic polarization, ionic polarization, interfacial polarization and rotational polarization.

8. The method of claim 1, wherein any one of the particles and the solvent includes a material showing the electrical polarization characteristic.

9. The method of claim 1, wherein the solvent includes a material having an electric polarization index of 1 or more.

10. The method of claim 1, wherein the solution includes a ferroelectric or superparaelectric material.

11. The method of claim 1, wherein the solution is encapsulated with a light transmissive material or partitioned with an insulating medium.

12. The method of claim 1, wherein the solution is a gel type.

13. The method of claim 1, wherein after a predetermined color is displayed on the display region by applying the electric field, the solution maintains the predetermined color for predetermined time although the electric field is removed.

14. The method of claim 1, wherein the electric field uses DC voltage or AC voltage including DC voltage component.

15. An apparatus, comprising:
an information acquisition unit acquiring information sensed by using at least one sensing unit;
a voltage signal generator generating a voltage signal based on the acquired information; and
a display unit variably tuning color and a transmittance of a display region of an object based on the generated voltage signal, wherein the display unit comprises a solution, which is comprised of a solvent and a plurality of particles dispersed in the solvent and is provided between two or more electrodes in which one of the electrodes is transparent, and the solution shows a variable electrical polarization characteristic, in which an induced electrical polarization quantity is changed according to a change in electric field,
wherein the color of the display unit is variably tuned by changing a distance between each particle of the plurality of particles to the substantially same extent such that the particles are evenly separated each other to the same extent so as to change a wavelength of light reflected from the particles, and the transmittance of the display region of the object is variably tuned by applying the electric field only to the specific portion of the electrode to move the particles to the specific portion of the electrode,
wherein the color and the transmittance of a display unit of an object is variably tuned by applying electric field corresponding to the voltage signal between the electrodes to which the solution is provided, and controlling at least one of the intensity and direction of the electric field to control the distance between each particle of the plurality of particles at a substantially same extent and to control the location of the plurality of particles,
wherein the particles have an electric charge of the same sign, and
as the electric field is applied, the distance between each particle of the plurality of particles reach a specific range by an interaction of electrophoretic force that is applied to the particles in proportional to the intensity of electric field, electrostatic attraction that is applied between the particles by the variable electric polarization characteristic and electrostatic repulsion that is applied between the particles having the electric charge of the same sign, and thus, as the distance between each particle of the plurality of particles reach the specific range, light having a specific wavelength is reflected from the plurality of particles,
wherein the plurality of particles show a steric effect, and as the electric field is applied, the distance between each particle of the plurality of particles reach the specific range by an interaction of the electrostatic attraction that is applied between the particles by the variable electric polarization characteristic and the steric hindrance repulsion, and thus, as the distance between each particle of the plurality of particles reach the specific range, light having a specific wavelength is reflected from the plurality of particles,
wherein when the electric field is applied, the particles are arranged three-dimensionally with having short range ordering within the solvent, and
wherein a first polarization region is formed to include a first particle of the plurality of particles and solvent within a region that is affected by an electrical attraction by an electric charge of the first particle, and a second polarization region is formed to include a second particle of the plurality of particles and solvent within a region that is affected by an electrical attraction by an electric charge of the second particle, wherein each of the first polarization region and the second polarization region acts like one large electrically polarized particle and interacts with one another.

16. The apparatus of claim 15, wherein the wavelength of the reflected light is changed continuously or in an analog manner.

17. The apparatus of claim 15, further comprising an emissive display apparatus.

18. The apparatus of claim 15, further comprising a solar cell.

19. The apparatus of claim 15, wherein the solution is encapsulated with a light transmissive material or partitioned with an insulating medium.

20. The apparatus of claim 15, wherein the information is surrounding environment information of the apparatus.

21. The apparatus of claim 15, wherein the information is input by the user of the apparatus.

22. The apparatus of claim 15, wherein the sensing unit includes a sample region display unit,
the sample region display unit displays gradually changed sample colors, and the information is at least one color selected by a user among the sample colors.

23. The apparatus of claim 15, wherein the display unit is flexible.

24. The apparatus of claim 15, wherein the display unit covers at least a part of the surface of the apparatus.

25. A terminal apparatus including the apparatus of claim 15, wherein the information is information on contents provided to a user of the terminal apparatus, and
the display unit displays a color based on information on contents.

26. The method of claim 2, wherein the wavelength of the reflected light is changed continuously or in the analog manner within a single pixel of the display region.

27. The apparatus of claim 16, wherein the wavelength of the reflected light is changed continuously or in the analog manner within a single pixel of the display unit.

* * * * *